United States Patent
Speks et al.

(10) Patent No.: US 9,706,449 B2
(45) Date of Patent: Jul. 11, 2017

(54) TECHNIQUE FOR TRANSFERRING A SESSION WITH CHANGEABLE SESSION STATE

(71) Applicant: Telefonaktiebolaget L M Ericsson (publ), Stockholm (SE)

(72) Inventors: Oliver Speks, Eschweiler (DE); Jan Holm, Stora Skedvi (SE); Karl-Peter Ranke, Herzogenrath (DE); Chunbo Wang, Shanghai (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/767,162

(22) PCT Filed: Feb. 12, 2013

(86) PCT No.: PCT/EP2013/052746
§ 371 (c)(1),
(2) Date: Aug. 11, 2015

(87) PCT Pub. No.: WO2014/124659
PCT Pub. Date: Aug. 21, 2014

(65) Prior Publication Data
US 2015/0382250 A1 Dec. 31, 2015

(51) Int. Cl.
*H04W 36/00* (2009.01)
*H04L 29/06* (2006.01)

(52) U.S. Cl.
CPC ..... *H04W 36/0022* (2013.01); *H04L 65/1016* (2013.01)

(58) Field of Classification Search
None
See application file for complete search history.

(56) References Cited

U.S. PATENT DOCUMENTS

| 2008/0176552 A1* | 7/2008 | Hamano | H04W 48/18 455/422.1 |
| 2010/0128707 A1* | 5/2010 | Horio | H04L 12/4641 370/338 |

(Continued)

FOREIGN PATENT DOCUMENTS

GB 2480106 A 11/2011

OTHER PUBLICATIONS

International Search Report and Written Opinion of the International Searching Authority, Application No. PCT/EP2013/052746, Jan. 21, 2014.

(Continued)

*Primary Examiner* — Moustapha Diaby
(74) *Attorney, Agent, or Firm* — Sage Patent Group

(57) ABSTRACT

A technique for triggering a change of a call state of a mobile device is presented. A network forwards towards a callee an invitation for a call originating via a first Radio Access Technology (RAT) from the mobile device, and forwards a response of the callee via the first RAT towards the mobile device. The response indicates a change of the call state from a first state to a second state. A first network component changes via a second RAT the call state of the mobile device when receiving information indicative of the first state followed by receiving a message indicative of the second state. A second network component receives from the first network component an invitation for a transfer of the call of mobile device from the first RAT to the second RAT.

25 Claims, 12 Drawing Sheets

(56) References Cited

U.S. PATENT DOCUMENTS

| | | | |
|---|---|---|---|
| 2010/0223328 A1* | 9/2010 | Haataja | H04L 67/26 709/203 |
| 2013/0143565 A1* | 6/2013 | Zisimopoulos | H04W 36/14 455/436 |

OTHER PUBLICATIONS

Written Opinion of the International Preliminary Examining Authority, Application No. PCT/EP2013/052746, Mar. 4, 2015.

International Preliminary Report on Patentability, Application No. PCT/EP2013/052746, May 29, 2015.

3GPP, Technical Specification, "3rd Generation Partnership Project; Technical Specification Group Services and System Aspects; Single Radio Voice Call Continuity (SRVCC); Stage 2 (Release 11)", 3GPP TS 23.216 V11.8.0 (Mar. 2013), 67 pp.

3GPP, Technical Specification, "3rd Generation Partnership Project; Technical Specification Group Services and System Aspects; IP Multimedia Subsystem (IMS) Service Continuity; Stage 2 (Release 12)", 3GPP TS 23.237 V12.2.0 (Mar. 2013), 169 pp.

3GPP, Technical Specification, "3rd Generation Partnership Project; Technical Specification Group Core Network and Terminals; IP Multimedia (IM) Core Network (CN) subsystem IP ' Multimedia Subsystem (IMS) Service Continuity; Stage 3 (Release 11)", 3GPP TS 24.237 V11.5.0 (Dec. 2012), 368 pp.

3GPP, Technical Specification, "3rd Generation Partnership Project; Technical Specification Group Core Network and Terminals; IP Multimedia (IM) Core Network (CN) subsystem IP Multimedia Subsystem (IMS) Service Continuity; Stage 3 (Release 12)", 3GPP TS 24.237 V12.0.0 (Mar. 2013), 390 pp.

3GPP, Technical Specification, "3rd Generation Partnership Project; Technical Specification Group Core Network and Terminals; Mobile radio interface Layer 3 specification; Core network protocols; Stage 3 (Release 12)", 3GPP TS 24.008 V12.1.0 (Mar. 2013), 679 pp.

Ericsson et al., "MSC server state verification procedure solving an EN", 3GPP draft; 24.237 Rel-11 MSC Server State Verification Procedure Solving an EN V8, 3GPP TSG CT WG1 Meeting #76, C1-120231, Xiamen, China, Feb. 6-10, 2012, 14 p.

Samsung, "Discussion: Evaluation of solutions for SRVCC in alerting phase", Agenda Item: 11.13.1, Document for: Discussion and Agreement, 3GPP TSG CT WG1 Meeting #66, C1-103179, Xi'an, China, Aug. 23-27, 2010, 3 pp.

* cited by examiner

TECHNIQUE FOR TRANSFERRING A SESSION WITH CHANGEABLE SESSION STATE

CROSS REFERENCE TO RELATED APPLICATION

This application is a 35 U.S.C. §371 national stage application of PCT International Application No. PCT/EP2013/052746, filed on 12 Feb. 2013, the disclosure and content of which is incorporated by reference herein in its entirety. The above-referenced PCT International Application was published in the English language as International Publication No. WO 2014/124659 A1 on 21 Aug. 2014.

TECHNICAL FIELD

The present disclosure generally relates to a technique and apparatus of triggering a change of a call state of a mobile device connectable to a telecommunication network by means of a first Radio Access Technology and a second Radio Access Technology. More specifically and without limitation, the present disclosure relates to an apparatus for changing a state of a communication session that is subjected to a transfer and to a method of operating such an apparatus.

BACKGROUND

A communication session, such as a voice or video call, can assume different session states. For example, in the course of establishing the communication session, two or more different session states are subsequently assumed by the communication session. For processing the communication session and for interpreting control signals, network components and terminals involved in the communication session have to agree on the current session state. However, when the communication session is subjected to a transfer, an interruption of a communication link between a network component and a terminal can bring the session state at the network component and the session state at the terminal out of synchronization.

By way of example, a network operator providing service coverage according to Universal Mobile Telecommunication System (UMTS) may want to move voice services to Voice over Internet Protocol (VoIP) using an Internet Protocol Multimedia Subsystem (IMS) in a Core Network (CN) in conjunction with a Radio Access Technology (RAT) according to Long Term Evolution (LTE). Since UMTS provides voice services in the circuit-switched domain, a call session initiated in the packet-switched domain according to LTE has to be transferred from the RAT in the packet-switched domain to another RAT in the circuit-switched domain. However, a message relevant for the session state can be lost in the context of the transfer, so that a User Equipment (UE) and a network component assume different session states.

As an example for the transfer, Single Radio Voice Call Continuity (SRVCC) according to standard document 3GPP TS 23.216 (Release 11, Version 11.6.0) specifies a technique for service continuation of IMS voice calls. The IMS voice call can, for example, originate in the packet-switched domain using a conversational VoIP bearer according to the Quality of Service (QoS) Class Identifier "QCI1". The QCI1 VoIP bearer is merely one example for an Evolved Packet System (EPS) bearer. In UMTS and GPRS, data sessions are established differently using the Packet Data Protocol (PDP) context procedure. SRVCC allows transferring a voice call from the packet-switched domain of LTE using VoIP and IMS to the circuit-switched domain of UMTS. SRVCC thus provides a fallback position when introducing VoIP services according to the LTE standard.

Standard documents 3GPP TS 23.237 (Release 12, Version 12.1.0) and 3GPP TS 24.237 (Release 11, Version 11.4.0) specify the SRVCC transfer for video and voice calls in an Alerting Call State. The Alerting Call State of a session may be defined as the state of a party engaged in a session that is in an early dialog state according to Sect. 12.1 of RFC 3261 (Version of June 2002). Alternatively or in addition, the Alerting Call State of the call may be defined as the state of a session with a speech media component after exchanging an initial "SIP INVITE" request that establishes the dialog and a "SIP 180" Ringing response that indicates the alerting, and before exchanging a SIP final response for the initial "SIP INVITE" request that establishes the session according to Clause 12.1 of standard document 3GPP TS 24.237.

To tackle a possible incompatibility between the session state of the calling UE and the session state of a Mobile Switching Center (MSC) server due to a radio interruption during the SRVCC transfer, the standard document 3GPP TS 24.237 recommends that the MSC server verify the call state using the "STATUS ENQUIRY" procedure of standard document 3GPP TS 24.008 (Release 12, Version 12.0.0). If the call states are incompatible, the transferred session is released according to standard document 3GPP TS 24.237, Clause 12.6.3, Note 3.

Document WO 2011/139045 A2 teaches a technique for synchronizing different call states at the remote other end of the dialog. Here, an incompatibility is caused by the called UE answering the call just before the called UE is handed over from the packet-switched mode to the circuit-switched mode according to SRVCC. No solution is provided for synchronizing the calling UE and the telecommunications network from which the call is originating.

Thus, incompatible session states can arise in the prior art and lead to an unexpected termination of the session.

SUMMARY

There is a need for a technique that improves success rates of session transfer for a communication session with changing session states.

According to one aspect, a method of triggering a change of a call state of a mobile device connectable to a telecommunications network by means of a first Radio Access Technology and a second Radio Access Technology is provided. The telecommunications network is configured to forward towards a callee an invitation for a call originating by means of the first Radio Access Technology from the mobile device and to forward a response of the callee by means of the first Radio Access Technology towards the mobile device, the response indicating a change of the call state from a first state to a second state, and wherein a first network component of the telecommunications network is configured to change by means of the second Radio Access Technology the call state of the mobile device when receiving a second message indicative of the second state preceded by receiving a first message indicative of the first state. The method comprises the steps performed by a second network component of the telecommunications network of receiving from the first network component an invitation for a transfer of the call from the first Radio Access Technology to the second Radio Access Technology and, if an acknowledgement for the response forwarded to the mobile device is absent, sending to the first network component the second message indicative of the second state preceded by sending to the first network component the first message indicative of the first state.

The first state may be different from the second state. The first state may correspond to a state prior to the second state in a predetermined sequence of call states. The second state may correspond to, or may be implied by, the response of the callee. The loss of the response forwarded to the mobile device or the loss of the acknowledgement from the mobile device for the forwarded response may be detected by the absence of the acknowledgment at the second network component. E.g., the loss may occur at the radio interface prior to, due to and/or during the transfer. At least in some embodiments, successively sending the first message indicative of the first state and the second message indicative of the second state may trigger the first network component to update the call state of the mobile device, so that the call state of the mobile device is brought in conformity with the response of the callee.

The mobile device may be selectively connectable to the telecommunications network via the first Radio Access Technology and the second Radio Access Technology. The selection may be based on a measurement report provided by the mobile device.

The second network component may have access to the second Radio Access Technology via the first network component. Sending the first message indicative of the first state may include sending an information request to the first network component. The first network component may assume the first state upon reception of the first message or upon sending an acknowledgment for the first message towards the second network component.

The second message indicative of the second state may be sent responsive to the acknowledgment, e.g., received from the first network component, for the first message indicative of the first state.

A communication leg to the callee (also referred to as remote leg) may be updated in accordance with the transfer. The absence of the acknowledgment may be determined upon or after the updating of the communication leg to the callee. Alternatively or in combination, the absence may be determined upon completion of the transfer. The updating of the communication leg to the callee may include sending an updating request indicating that communication towards the caller is to be directed towards or addressed to the first network component.

The acknowledgement for the response may be expected at the second network component. E.g., the second network component may expect the acknowledgment based on a communication protocol stipulating the acknowledgment for the forwarded response.

The first state may represent an alerting call. The second state may represent an active call. The first state may also be referred to as Alerting Call State or Call Delivered State. The second state may also be referred to as Active Call State. The response of the callee and/or the second message indicative of the second state may include a final response to the invitation for the call. For example, the Active Call State may be implied by a final response, e.g., a SIP 200 OK response. The acknowledgment, which is absent at the second network component, may be a final response acknowledgment, e.g., a SIP ACK message.

Alternatively, the first state may represent a pre-alerting call. The second state may represent an alerting call. The first state may also be referred to as Pre-Alerting Call State, Call Proceeding State or Mobile Originating Call Proceeding State. The second state may also be referred to as Alerting Call State or Call Delivered State. The response of the callee and/or the second message indicative of the second state may be a provisional response to the invitation for the call. For example, a Mobile Originating Alerting indication may be implied by a provisional response, e.g., a SIP 180 response. The acknowledgement, which is absent at the second network component, may be a provisional response acknowledgment, e.g., a SIP PRACK message.

The invitation for the transfer may be received in an early dialog initiated by the invitation for the call. The dialog may be early as long as no final response has been exchanged in relation to the call invitation. The early dialog state may be established by the invitation for the call. The transfer may be performed in an Alerting Call State or in a Pre-Alerting Call State of the call. Alternatively or in addition, the early dialog state may be defined according to Request for Comments (RFC) 3261, Section 12. The early dialog state may be established by or after receiving a provisional response to the invitation and before receiving a final response to the invitation. The response may be a SIP Response having a SIP code. The response may be forwarded prior to or during performing the transfer.

The first network component may receive, prior to sending the invitation for the transfer, an indication of the transfer. The indication may be received from a Mobility Management Entity (MME). The indication may be triggered by a measurement indicating that the mobile device moves out of a coverage region of the first Radio Access Technology. The measurement may be performed and/or reported by the mobile device, e.g., in a measurement gap of the first Radio Access Technology. A first Radio Access Network providing the first Radio Access Technology may decide upon the transfer based on the measurement. The first network component may be used in conjunction with the second Radio Access Technology.

Each of the first Radio Access Technology and the second Radio Access Technology may be defined by a corresponding Radio Access Network or by a corresponding bearer type or by a combination of Radio Access Network and bearer type. The bearer type may be, e.g., a packet-switched bearer or a circuit-switched bearer. The transfer of the call may imply a change of the Radio Access Network used for the connection between the telecommunications network and the mobile device and/or a change of the bearer type used for communication between the telecommunications network and the mobile device.

The transfer may include at least one of a session transfer and an access transfer. The transfer may include a transfer from a packet-switched domain to a circuit-switched domain. The packet-switched domain may use the first Radio Access Technology. The circuit-switched domain may use the second Radio Access Technology. At least one of the invitation for the call, the response of the callee and the invitation for the transfer may be exchanged by means of a packet-switched protocol. For example, the invitation of the transfer may be sent by an MSC to an IMS.

The first Radio Access Technology may be provided by an E-UTRAN (Evolved UTRAN). The second Radio Access Technology may be provided by a UTRAN (UMTS Terrestrial RAN) or GSM EDGE RAN (GERAN). The transfer may be a Single Radio Voice Call Continuity (SRVCC) transfer.

At least one of the invitation for the call, the response from the callee and the invitation for the transfer are exchanged according to the Session Initiation Protocol (SIP). The invitation may be a SIP INVITE request. For example, in the SRVCC context, all of aforementioned three signals are exchanged by means of SIP. The invitation may include data according to a Session Description Protocol (SDP). The received response may be indicative of progress in establishing the call. The response may be a provisional response or a final response to the invitation for the call. The response may include a SIP 180 response indicating that the callee is ringing or a SIP 200 OK response indicating success of the call invitation.

The call state may be changed via the second Radio Access Technology using a signal in the circuit-switched domain. The first network component may change the call state by sending a call control signal, e.g., a Circuit-Switched Connect (CS Connect) signal, such as a Call Control (CC) signal according to 3GPP TS 24.008. In response to the CS Connect signal, a Circuit-Switched Connect Acknowledgement signal may be received from the mobile device at the first network component. At least a part of the communication within a core network of the telecommunications network may use a packet-switched protocol before, during and after the transfer. After the transfer, communication of the second network component towards a domain dedicated for the first RAT, e.g. a packet-switched domain, may be released. The communication may be via a domain dedicated for the second RAT, e.g. a circuit-switched domain including the MSC.

The first network component may communicate towards the mobile device by means of the second Radio Access Technology. The first network component may include a Mobile-services Switching Center (MSC). As used herein, the term MSC encompasses both a Mobile-services Switching Center Server (MSC-S) and a Mobile-services Switching Center. The first network component may be at least substantially unused by the first Radio Access Technology (e.g., in relation to the mobile device), if the mobile device is in a wireless connection using the first Radio Access Technology.

The second network component may be connected to both a domain dedicated for the first Radio Access Technology and a domain dedicated for the second Radio Access Technology. The domain dedicated for the first Radio Access Technology may include a packet-switched core network. The domain dedicated for the second the Radio Access Technology may include a circuit-switched core network. The second network component may include an Internet Protocol Multimedia Subsystem (IMS). The call may be anchored at the IMS. As used herein, the term IMS encompasses both an Internet Protocol Multimedia Subsystem Server (IMS-S) and an Internet Protocol Multimedia Subsystem. The IMS may include at least one of Intermediate Internet Protocol Multimedia Core Network Subsystem entities (Intermediate IM CN subsystem entities) and a Service Centralization and Continuity Application Server (SCC-AS).

The call states assumable by the mobile device and/or indicatable by the response may include the Call Proceeding State, the Call Delivered State and the Active Call State. The Call Proceeding State may be assumed by the mobile device upon or after sending the invitation for the call. The Call Proceeding State may be assumed by the second network component upon receiving or after forwarding the invitation for the call. A provisional response that is relevant for the call state, e.g., a SIP 180 response, may indicate a change of the call state from the Call Proceeding State to a Call Delivered State. The second network component may assume the Call Delivered State when forwarding the response. Alternatively or in combination, the first network component, e.g., the MSC, may assume the Call Delivered State in response to receiving a SIP INFO request in the early dialog. A final response, e.g., a SIP 200 OK response, may indicate a change of the first and/or second network component, e.g., the MSC, to switch from the Call Delivered State to an Active Call State. A signal derived by the first network component from the final response may induce the call state of the mobile device to change from the Call Delivered State to an Active Call State. The telecommunications network may provide a release message to the mobile device in case information indicative of the call state received from the mobile device is none of the Call Proceeding State, the Call Delivered State and the Active Call State.

The technique presented herein may be realized in form of software, in form of hardware, or using a combined software-hardware approach. As a further aspect, a computer program product is provided that comprises program code portions for performing the steps presented herein when the computer program product is run on at least one computing device. The computer program product may be stored on a computer-readable recording medium such as a memory chip, e.g., a flash memory chip, an optical recording medium and a hard disk. Moreover, the computer program product may be provided for download onto such a recording medium.

As to a hardware aspect, an apparatus for triggering a change of a call state of a mobile device connectable to a telecommunications network by means of a first Radio Access Technology and a second Radio Access Technology is provided. The telecommunications network is configured to forward towards a callee an invitation for a call originating by means of the first Radio Access Technology from the mobile device and to forward a response of the callee by means of the first Radio Access Technology towards the mobile device, the response indicating a change of the call state from a first state to a second state, and wherein a first network component of the telecommunications network is configured to change by means of the second Radio Access Technology the call state of the mobile device when receiving a second message indicative of the second state preceded by receiving a first message indicative of the first state. The apparatus comprises a receiving unit adapted to receive from the first network component an invitation for a transfer of the call from the first Radio Access Technology to the second Radio Access Technology, and a sending unit adapted to send to the first network component the second message indicative of the second state preceded by sending to the first network component the first message indicative of the first state, if an acknowledgement for the response forwarded to the mobile device is absent.

The apparatus may be located in the second network component of the telecommunications network.

According to a still further aspect, a telecommunications network for triggering a change of a call state of a mobile device connectable to a telecommunications network by means of a first Radio Access Technology and a second Radio Access Technology is provided. The telecommunications network is configured to forward towards a callee an invitation for a call originating by means of the first Radio Access Technology from the mobile device and to forward a response of the callee by means of the first Radio Access Technology towards the mobile device, the response indicating a change of the call state from a first state to a second state. The telecommunications network comprises a first network component configured to change by means of the second Radio Access Technology the call state of the mobile device when receiving a second message indicative of the second state preceded by receiving a first message indicative of the first state; and a second network component including a receiving unit adapted to receive from the first network component an invitation for a transfer of the call from the first Radio Access Technology to the second Radio Access Technology, and a sending unit adapted to send to the first network component the second message indicative of the second state preceded by sending to the first network component the first message indicative of the first state, if an acknowledgement for the response forwarded to the mobile device is absent.

The first network component may further include a sending unit adapted to sent an invitation for a transfer of the call from the first Radio Access Technology to the second Radio Access Technology. The transfer may be a session transfer. Alternatively or in combination, the first network component may further include a receiving unit adapted to receive form the second network component a first message indicative of the first state. The first network component may switch to the first state responsive to the first message.

The receiving unit of the first network component may further be adapted to receive, e.g., responsive to sending an acknowledgment for the first message, from the second network component the second message indicative of the second state. The first network component may further include a providing unit adapted to provide by means of the second Radio Access Technology to the mobile device a message for changing the call state due to the second message indicative of the second state.

The receiving unit or a second receiving unit of the first network component may be adapted to receive from the mobile device a status message indicating at least one of that the mobile device is already in the second state and a protocol type incompatibility between a current state of the mobile device and the provided message for the change. The first network component may be adapted to switch to the second state in response to receiving the status message from the mobile device.

BRIEF DESCRIPTION OF THE DRAWINGS

Further aspects and advantages of the technique presented herein will become apparent from the following description of exemplary embodiments with reference to the drawings, wherein FIG. 1 schematically illustrates embodiments for an apparatus and a telecommunications network in an exemplary telecommunications environment.

DETAILED DESCRIPTION

In the following description of exemplary embodiments, for purposes of explanation and not limitation, specific details are set forth, such as particular signal processing components and sequences of steps, in order to provide a thorough understanding of the present disclosure. It will be apparent to one skilled in the art that the technique described herein may be practiced in other embodiments that depart from these specific details. For example, while the following embodiments are primarily described in context with a voice call session, the technique can also be implemented for any other communication session, e.g., video call sessions, media streaming sessions or multiplayer online game sessions. While the embodiments relate to Single Radio Voice Call Continuity (SRVCC) according to Release 11 and expected Release 12 of standard specification 3GPP TS 23.216 (Version 11.7.0), the technique can also be implemented in the context of any other Voice Call Continuity (VCC), for example according to Release 7 of standard specification 3GPP TS 23.206 (Version 7.5.0). While the description provides exemplary implementations for a transfer from Evolved UTRAN to UTRAN, it is readily apparent to the skilled person that the technique described herein can also be implemented in a telecommunications network configured for transfer, in any direction, between any one of Evolved UTRAN, UTRAN and GERAN. The transfer can include any transition between a circuit-switched domain and a packet-switched domain, e.g., LTE or non-3GPP access networks, such as Wireless Local Area Network (WLAN) based on IEEE 802.11 standards. Examples of non-3GPP access networks are included in standard specification 3GPP TS 24.302 (Release 11, Version 11.5.0).

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that, while the following embodiments will primarily be described in context with methods and apparatuses, the technique can also be embodied in a computer program product as well as in a system comprising a computer processor and a memory coupled to the processor, wherein the memory is encoded with one or more programs that may perform the services or functions and steps disclosed herein.

Figure 1:
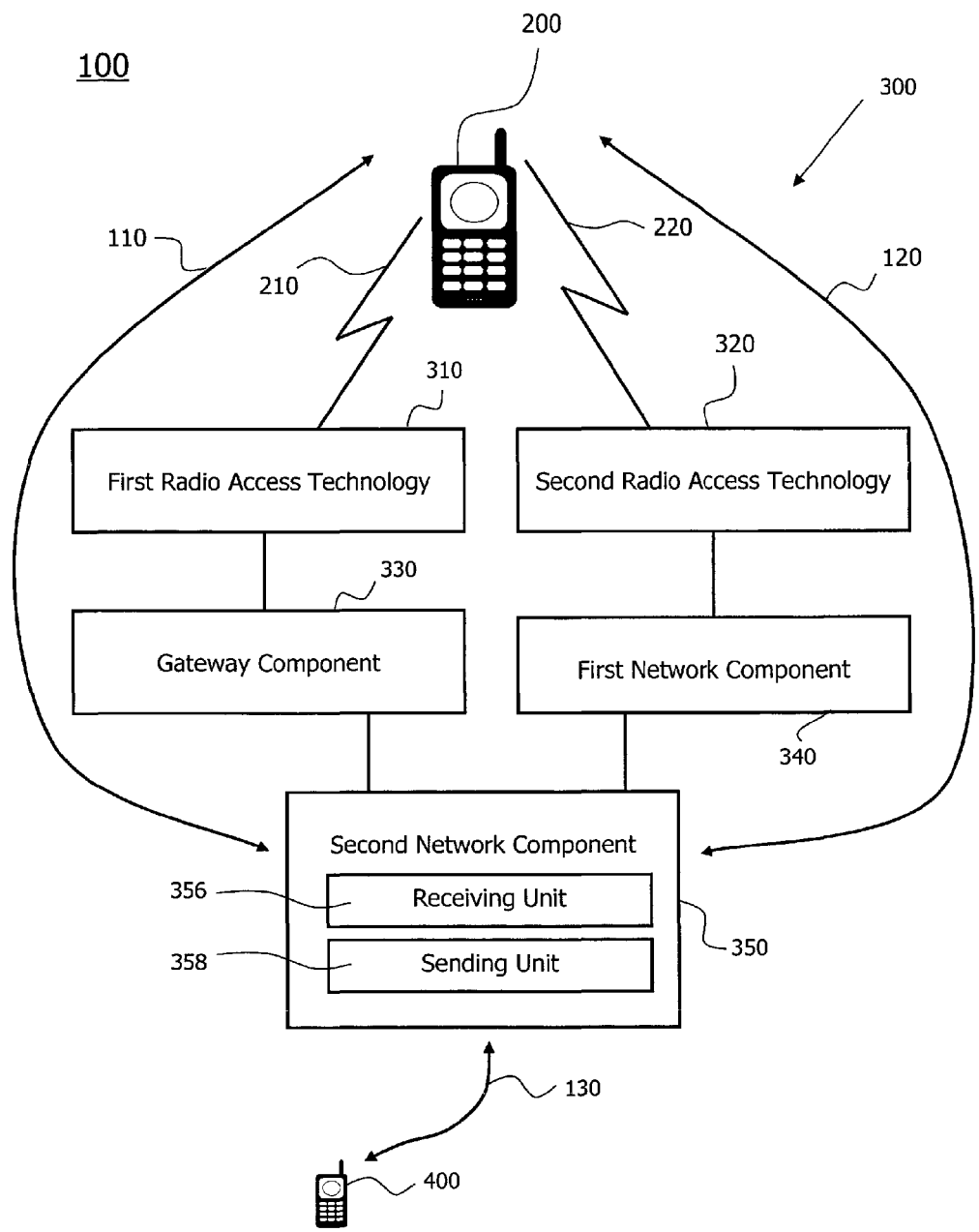

An exemplary communication system 100 for implementing a device embodiment is schematically illustrated in FIG. 1. The communication system 100 provides a first access leg 110 and a second access leg 120 for wirelessly connecting a mobile device 200 via a telecommunications network 300 and a remote leg 130 to a remote communication device 400.

The telecommunications network 300 provides a first Radio Access Technology (RAT) 310 and a second RAT 320. The first RAT 310 and the second RAT 320 specify a wireless connection 210 and a wireless connection 220, respectively, to the mobile device 200.

In one implementation of the telecommunications network 300, the RATs 310 and 320 provide connections 210 and 220 by means of a first Radio Access Network (RAN) and a second RAN, respectively. In another implementation of the telecommunications network 300, the first RAT 310 and the second RAT 320 provide wireless connections 210 and 220, respectively, by means of the same RAN. In both implementations, a coverage area of the first RAT 310 and the second RAT 320 at least overlaps for a transfer of the call of the mobile device 200 from the first RAT 310 to the second RAT 320.

The RAN providing the second RAT 320 is connected via a first network component 340 to a second network component 350. The RAN providing the first RAT 310 is coupled to a gateway component 330, which is coupled to the second network component 350. A call originating from the mobile device 200 using the first RAT 310 is anchored at the second network component 350. At least for the purpose of control signaling, the first access leg 110 via the first RAT 310 and the second access leg 120 via the second RAT 320 are coupled to the remote leg 130 by the second network component 350.

Single Radio Voice Call Continuity (SRVCC) is implemented in the telecommunications network 300 so that radio coverage by the first RAT 310 is complemented with radio access via the second RAT 320. SRVCC has been specified initially in Release 8 of standard specifications 3GPP TS 23.216 and 3GPP TS 23.237 to support the transfer of an active call or other active session from an Evolved Universal Terrestrial Radio Access Technology (E-UTRAN) or High-Speed Packet Access Network (HSPAN) as an example of the first RAT 310 in the packet-switched (PS) domain to GERAN or UTRAN as an example of the second RAT 320 in the circuit-switched (CS) domain. Since Release 10, SRVCC support for calls in an Alerting Call State is specified. SRVCC support for calls in a Pre-Alerting Call State is expected for Release 12.

By way of example, SRVCC according to standard specification 3GPP TS 23.216 provides Internet Protocol Multimedia Subsystem (IMS) Voice Call Continuity (VCC) for the conversational QCI1 VoIP bearer from E-UTRAN to the circuit-switched domain in GERAN or UTRAN, when the mobile device 200 is transmitting or receiving only via the second RAT 320 at a given time. To this end, the first network component 340 is enhanced for SRVCC. E.g., a Mobile-services Switching Center (MSC) server enhanced for SRVCC according to Clause 5.2.2 of 3GPP TS 23.216 implements the first network component 340.

Standard specifications TS 23.237 (Version 12.1.0) and TS 24.237 (Version 11.4.0) define the SRVCC transfer for calls in the Alerting Call State. In at least some implementations, the Alerting Call State can be defined as a state, wherein
  (i) the mobile device 200 is engaged in a session with speech media component in early dialog;
  (ii) a ringing response to the invitation for a call to establish the session has been sent or received; and
  (iii) a final response for the invitation to establish the call session has not been sent or received.

Alternative or additional criteria defining the Alerting Call State of the call session are provided in Clause 12.2.3B.1 of standard specification 3GPP TS 24.237.

Figure 2:
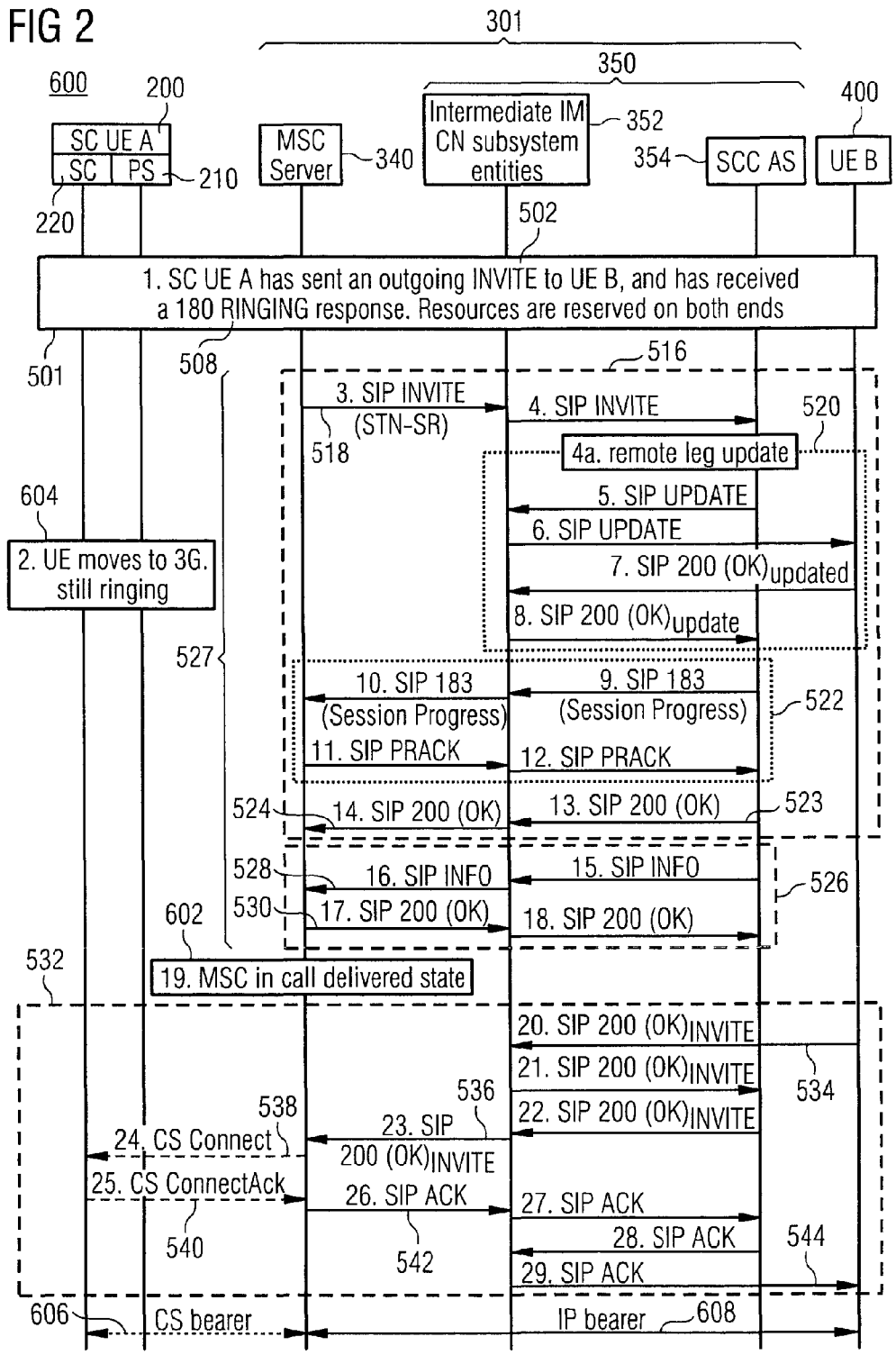
FIG. 2 shows a signaling diagram schematically illustrating a successful SRVCC transfer of a mobile originating call in an Alerting Call State.

FIG. 2 schematically illustrates a signaling diagram 600 for a successful SRVCC transfer of a call originating from the mobile device 200 in the Alerting Call State (also referred to as a mobile originating alerting call) according to Annex A.17.3 of standard specification 3GPP TS 24.237. The mobile device 200 functions as the source User Equipment (denoted by SC UE A), i.e., the caller of the call. The mobile device 200 initially uses the first RAT 310 for a wireless connection 210 in the packet-switched (PS) domain. The mobile 200 is further adapted for a circuit-switched (CS) wireless connection 220 via the second RAT 320. For setting up a session dialog, signals 501 are exchanged via the first access leg 110 to the second network component 350 and via the remote leg 130 towards the remote communication device 400 functioning as the destination User Equipment (denoted by UE B). In the Core Network (CN) 301, the second network component 350 includes Intermediate IP Multimedia CN subsystem entities 352 (also referred to as Intermediate IM CN subsystem entities) and a Service Centralization and Continuity Application Server (SCC-AS) 354. The first network component 340 includes a Mobile Switching Center (MSC). The second access leg 120 including the first network component 340 is not involved in the initial signal communication 501.

The initial signal communication 501 includes an invitation 502 for the call sent to the remote communication device 400. The initial signal communication 501 further includes a ringing response 508 received by the mobile device 200. The initial signal communication 501 further includes a trying response that is not shown in FIG. 2 for clarity. As a result of the initial signal communication 501, the involved components 200, 350 and 400 consistently consider the call to be in the Alerting Call State.

The outgoing call of the mobile device 200 is anchored at the SCC-AS 354 of the second network component 350. As the mobile device 200 moves out of the area covered by the first RAT 310, the first network component 340 receives an indication for a session transfer (which subsequently entails an access transfer of the mobile device 200), as described in standard specification 3GPP TS 23.216. The first network component 340 initiates the session transfer of the call session originating from the mobile device 200 using a Session Transfer Number (STN) for the SRVCC procedure as specified in standard specifications 3GPP TS 23.216 and 3GPP TS 23.237. Subscription information abbreviated by STN-SR includes a routing number indicating the SCC-AS 354 or an Access Transfer Control Function (ATCF), if SRVCC enhanced with ATCF is used.

Signals 516 exchanged in the network 300 for performing the transfer from the first RAT 310 to the second RAT 320 establish a communication path between the remote communication device 400 and the first network component 340.

An invitation 518 including the STN-SR for the transfer is sent by the first network component 340 to the second network component 350. The second network component 350 provides updating signals 520 towards the remote leg 130 including an update request. The update request contains a Session Description Protocol (SDP) offer for communication between the remote communication device 400 and the first network component 340. The remote communication device 400 provides an OK response signal including an SDP answer to the second network component 350. The SDP answer indicates that resources are available. Further definitions for the exchange of offer and answer according to the SDP are provided in documents RFC 3264 and RFC 6157.

The second network component 350 sends a session progress response containing the SDP answer to the first network component 340 in signal communication 522. The session progress response is provided by the second network component 350 with a Recv-Info header field to the first network component 340. The session progress response is a so-called reliable response that requires a provisional acknowledgment.

The second network component 350 sends an OK response signal 523, 524 to the first network component 340 for acknowledging the provisional acknowledgment from the first network component 340. The signal 524 thus concludes the session progress provisional response of the signal communication 522 and the transfer communication 516 initiated by the invitation signal 518 for the transfer.

In signal communication 526, the first network component 340 is informed that the call, which is transferred, is in the originating Alerting Call State. The signal communication 516 for the transfer and the signal communication 526 informing the first network component 340 as to the Alerting Call State are collectively indicated by reference sign 527.

As a result of the initial signal communication 501 triggered by the calling mobile device 200 and the transfer signal communication 527 triggered by the need for the transfer, a component call state 602 of the first network component 340 is consistent with a call state 604 of the mobile device 200. Both the component call state 602 and the call state 604 assume the Alerting Call State, which is also referred to as a call delivered state or a ringing state.

A dialog, such as the dialog initiated by the invitation signal 502, is referred to as an early dialog as long as a final response in signal communication 532, such as a response 534 from the remote communication device 400 answering the call, has not been exchanged. For the call establish by means of the signals shown in FIG. 2, the dialog between the mobile device 200 and the remote communication device 400 is an early dialog, when the call is in the Pre-Alerting Call State or in the Alerting Call State.

While the present invention is described for a call session that assumes a Pre-Alerting Call State, an Alerting Call State and an Active Call State, the technique can readily be applied to a call assuming more or less than those three call states and to any other communication session that assumes two or more different session states.

With the completion of the transfer, the communication between the mobile device 200 and the network 300 is applied to a circuit-switched bearer 606, and the communication of the first network component 340 towards the second network component 350 and the remote communication device 400 is applied to an IP bearer 608.

When the remote communication device 400 accepts the call, the signal communication 532 is triggered for changing the component call state 602 and the call state 604 to the Active Call State. The final response signal 534 is provided by the remote communication device 400 to the second network component 350. The response 534 for the call invitation 502 is forwarded as final response signal 536 to the first network component 340.

In the situation illustrated in FIG. 2, the transfer is completed prior to reception of the final response 534, which is why the mobile device 200 communicates via the circuit-switched connection 220. A connect message 538 as a circuit-switched signal indicative of the Active Call State is provided by the first network component 340 to the mobile device 200. The mobile device 200 acknowledges the connect message 538 by sending an acknowledgement message 540 in the circuit-switched domain to the first network component 340. The first network component 340 acknowledges the final response 536 by sending an acknowledgment request 542, e.g. using an IP bearer 608, to the second network component 350. The acknowledgement request 542 is forwarded by the second network component 350 as acknowledgement request 544 towards the remote communication device 400.

As a result of the successful signal communications shown in FIG. 2, both the component call state 602 and the call state 604 assume the Active Call State. However, at least some of the signals exchanged with the mobile device 200 prior to or during the transfer can be lost, i.e., a message relevant for the call state 604 does not reach the mobile device 200 via the first RAT 310 and not via the second RAT 320. As a first potential reason, when the mobile device 200 moves away from the coverage provided by the first RAT 310, the radio link is already fading, so that one or more of the signals in the signal communication 501 can be lost on the first access leg 110 prior to the transfer. The transfer takes a certain minimum period of time, e.g., for the signal communication 527 within the telecommunications network 300 and towards the remote communication device 400. As a second potential reason, responses from the remote communication device 400, which are to be forwarded to the mobile device 200, can be lost in at least some instances of the transfer, e.g., due to a radio connection break during the SRVCC transfer. As a third potential reason, the forwarded response can be lost at the side of the mobile device 200, e.g., due to the switching from the first RAT connection 210 to the second RAT connection 220. Independent of the underlying detailed reasons, there is a significant rate of lost messages sent towards the mobile device 200 in the context of transfer.

The potential loss of a message at the radio interface is not limited to signals of the initial signal communication 501. Depending on the relative timing between the transfer and the session states changing during session setup, packet-switched messages 539 and 541 (corresponding to the circuit-switched signals 538 and 540, respectively) exchanged during the signal communication 532 for session activation can also be lost, as discussed below with reference to FIG. 4. For example, if the SIP 200 OK final response signal from the remote communication device 400 reaches the SCC-AS 354, but does not reach the mobile device 200, the component call state 602 at the side of the telecommunications network 300 and the call state 604 at the side of the mobile device 200 can become inconsistent.

To tackle a possible incompatibility of call states between the mobile device 200 and the MSC server as an example of the first network component 340, standard specification 3GPP TS 24.237 recommends in Clause 12.6.3 that the MSC server verifies the call state using the Status Enquiry procedure in accordance with further standard specification 3GPP TS 24.008. If the call states 602 and 604 are incompatible, standard specification 3GPP TS 24.237 requires that the transferred session be released. For example, if the component call state 602 is the Active Call State and the Status Enquiry reveals that the call state 604 is the Alerting Call State (i.e., call delivered state), the MSC server 340 will release the call transferred by the SRVCC procedure.

As a consequence, a high failure rate of SRVCC transfers can occur for calls in Pre-Alerting or Alerting Call State.

The Pre-Alerting Call State encompasses the time after exchanging the invitation 502 for the call and prior to exchanging the ringing response 508. Support for SRVCC transfer in the Pre-Alerting Call State is expected for Release 12 of the standard specification 3GPP. A mobile device 200 according to Release 11 of the 3GPP standard specification releases the call, if the SRVCC transfer occurs before receiving the ringing response 508 indicating the Alerting Call State. In other words, a mobile device 200 according to Release 11 of the 3GPP standard specification releases the session for a call to be transferred in the Pre-Alerting Call State.

Figure 3:
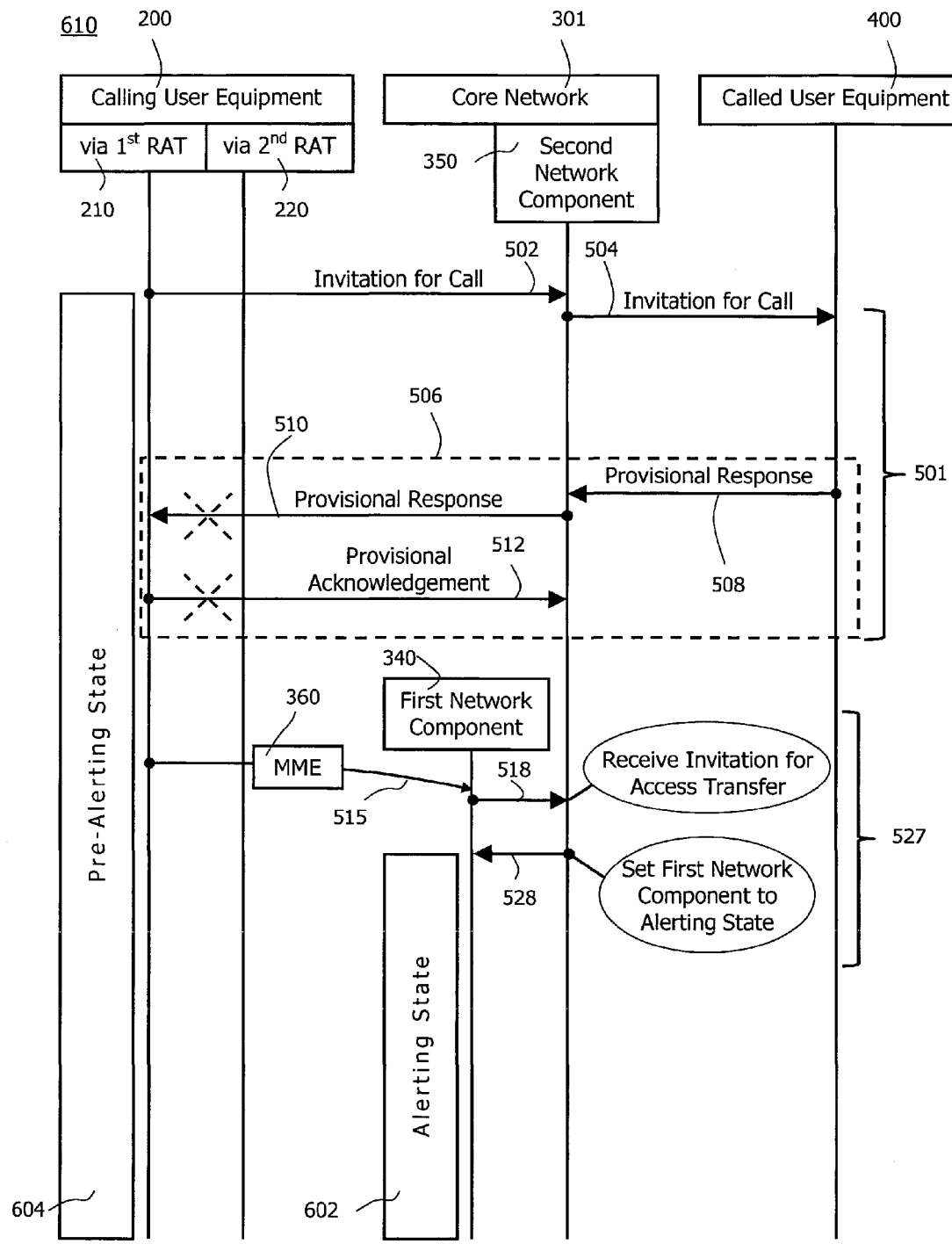
FIG. 3 shows a signaling diagram schematically illustrating a first case of a signal loss leading to inconsistent session states.

FIG. 3 shows a signaling diagram 610 schematically illustrating a first case of losing a response relevant for the call state, which leads to inconsistent call states according to a conventional method of changing call states. In the first case, a provisional response is lost. The transfer occurs in the Pre-Alerting Call State, as to be supported in Release 12 of 3GPP TS 24.237. For the clarity of the illustration, intermediate IMS node 352 is not shown.

The mobile device 200 initiates a speech session by sending the invitation 502 for the call, which is anchored at the second network component 350, e.g., at the SCC-AS 354. Both communication ends, the mobile device 200 and the remote communication device 400, have reserved session resources.

The second network component 350 receives the provisional response 508 indicating that the remote communication device 400 is ringing. The provisional response 508 thus implies an Alerting Call State.

The mobile device 200 sends measurement reports to the first RAT 310. The first RAT 310 decides as the source RAT to trigger the transfer. A trigger 515 for the transfer is provided by a Mobility Management Entity (MME) 360 to the first network component 340. In the case of the first RAT 310 implemented according to E-UTRAN and the second RAT 320 implemented according to UTRAN, the transfer can be an SRVCC handover from the packet-switched access 210 to the circuit-switched access 220.

The telecommunication network 300 including the second network component 350 forwards the response 508 as the provisional response 510 via the first RAT 310 towards the mobile device 200. In the scenario illustrated in FIG. 3, the provisional response 508 is relevant for the call state, since the provisional response requires a change of the call state 604.

The provisional response 510 or the corresponding provisional acknowledgment 512 from the mobile device 200 is lost at the radio interface of the first RAT 310, e.g., due to one of above-mentioned three reasons.

In the signal communication 527 for performing the transfer and setting up the first network component 340, the second network component 350 receives the invitation 518 for the transfer from the first network component 340. The final response 534 is received from the remote device 400 much later than the second network component 350 receives the invitation 518 for the transfer. Because the call is in the Alerting Call State from the point of view of the second network component 350 having received the provisional response 508, the second network component 350 sends the information message 528 to the first network component 340, a component call state 602 of which assumes the Alerting Call State.

A call state 604 of the mobile device 200 having not received the forwarded response 510 is still in the Pre-Alerting Call State. The loss of the provisional response 510 forwarded towards the mobile device 200 in the signal communication 501 for establishing the early dialogue of the session thus leads to inconsistent states 602 and 604, when a conventional technique for transferring the session and changing the session state according to the signal communication 527 is applied.

For Release 12 of specification 3GPP TS 24.237, it is expected that the mobile device 200 has to support a transfer of a session in the Pre-Alerting Call State. Applying the conventional communication 527 according to Clause 12.6.3 of document 3GPP TS 24.237 (Release 11, Version 11.4.0) also for the Pre-Alerting Call State, the MSC implementing the first network component 340 sends a Status Enquiry message to verify the call state 604 of the mobile device 200. The mobile device 200 sends to the first network component 340 a Status response message indicating that the call state 604 of the mobile device 200 is the Pre-Alerting Call State (also referred to as "mobile originating call proceeding state"). According to the conventional technique, when the first network component 340 detects that the call state 604 of the mobile device 200 is incompatible with the component call state 602 at this side of the network, the MSC 340 clears the call by sending a Release Complete Message according to Clause 12.6.3 of 3GPP TS 24.237.

The loss of the provisional response 510 forwarded towards the mobile device 200 thus leads to an unexpected termination of the call in the Pre-Alerting Call State from the point of view of the mobile device 200.

Figure 4:
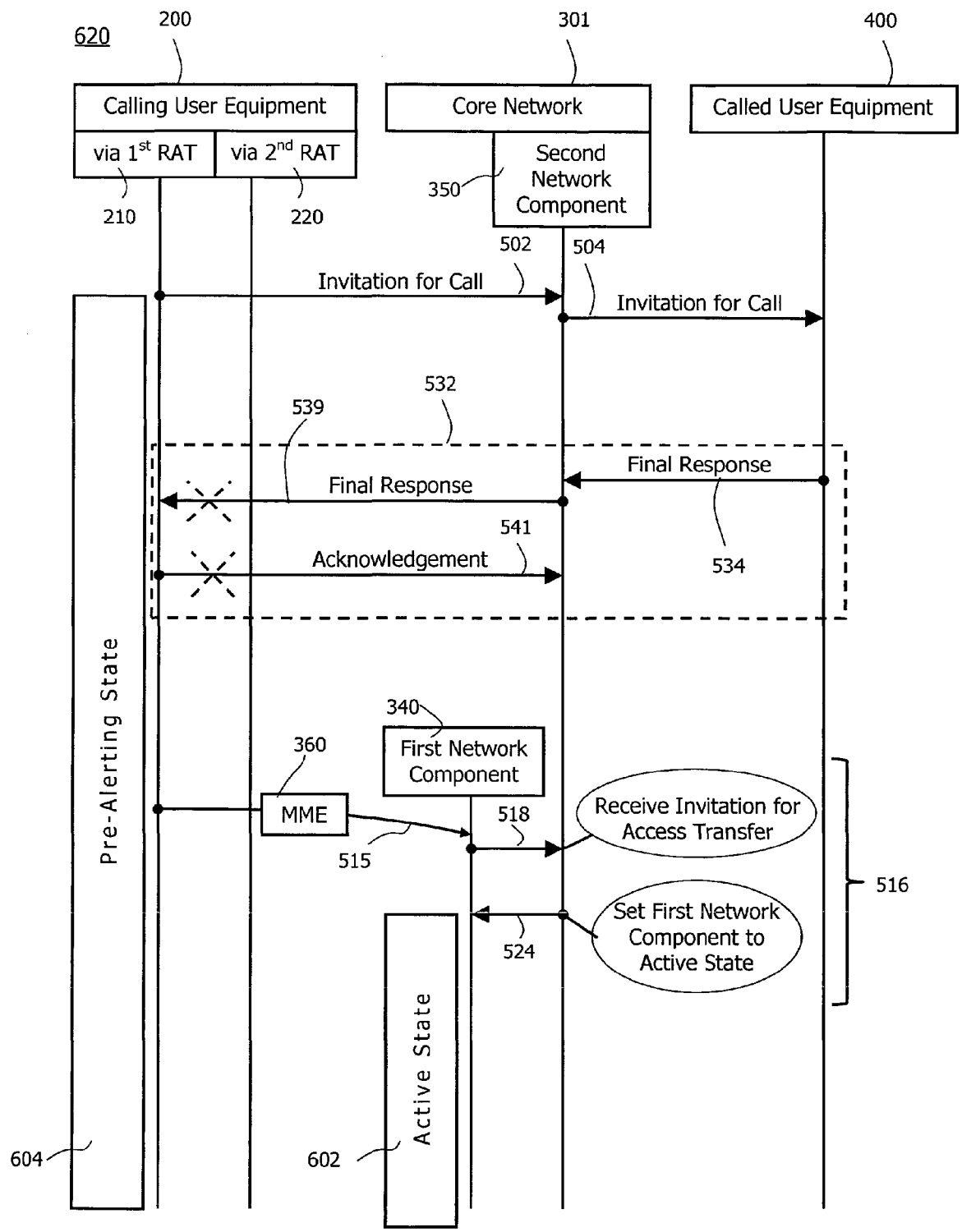
FIG. 4 shows a signaling diagram schematically illustrating a second case of a signal loss leading to inconsistent session states.

FIG. 4 shows a signaling diagram 620 schematically illustrating a second case of losing a response relevant for the call state 604. As in the first case described with reference to the signaling diagram 610, the mobile device 200 initiates a speech session by sending the invitation 502 for a call, which is anchored at the second network component 350. Both the mobile device 200 and the telecommunications network 300 are thus initially in the Pre-Alerting Call State. A provisional response indicating that the remote communication device 400 is ringing, i.e., the provisional response 508 implying the Alerting Call State, is not used during call setup in the second case.

The final response 534 from the remote communication device 400 implies the Active Call State and is forwarded as a final response 539 via the first RAT 310 towards the mobile device 200. For at least one of the three reasons indicated above, the response 539 or the corresponding acknowledgment 541 from the mobile device 200 is lost.

The trigger 515 for the transfer from the first RAT 310 to the second RAT 320 is received at the first network component 340 at approximately the same time as the second network component 350 receives the final response 534, in which case the loss of the final response 539 can be due to the radio break during the transfer performed at the side of the network 300 or at the side of the mobile device 200. The trigger for the transfer can also be received after the final response 534 is received, in which case the loss of the final response 539 or the acknowledgment 541 can be due to a fading radio connection 210.

For a mobile device 200 according to Release 12 (or later) of 3GPP TS 24.237, the first network component 340 initiates upon receiving the trigger 515 the session transfer by sending the invitation 518 for transfer. Since the second network component 350 has received the final response 534 from the remote communication device 400, the second network component 350 regards the call in the Active Call State. Consequently, the second network component 350 directly replies to the invitation 518 for the transfer with a final response 524 to the first network component 340. Further messages exchanged according to the signal communication 516 are not shown in FIG. 4 for the clarity of the illustration. The conventional technique for transfer according to signal communication 516 thus leads to the inconsistent call state 604.

Applying the conventional technique for performing a transfer according Release 11 of 3GPP TS 24.237 also in the Pre-Alerting Call State, the first network component 340 sends a Status Enquiry message to the mobile device 200 to verify the call state 604 of the mobile device 200 upon receiving the final response 524 to the invitation 518 for transfer. The mobile device 200 sends a Status Response indicating that the call state 604 is in the Pre-Alerting Call State (also referred to as "mobile originating call proceeding state"). According to Clause 12.6.3 of 3GPP TS 24.237, the MSC 340 clears the call by sending a Release Complete message, when the MSC detects that the call state 604 of the mobile device is incompatible to the component call state 602 being in the Active Call State.

As in the first case, the mobile device 200 does not receive any alerting indication before the remote communication device 400 answers the call, so that in both the first case of signaling diagram 610 and the second case of signaling diagram 620, the mobile device 200 disconnects the call and its user does not hear any ringing tone. Such a failure of the transfer in the Pre-Alerting Call State is a negative experience for the user.

Figure 5:
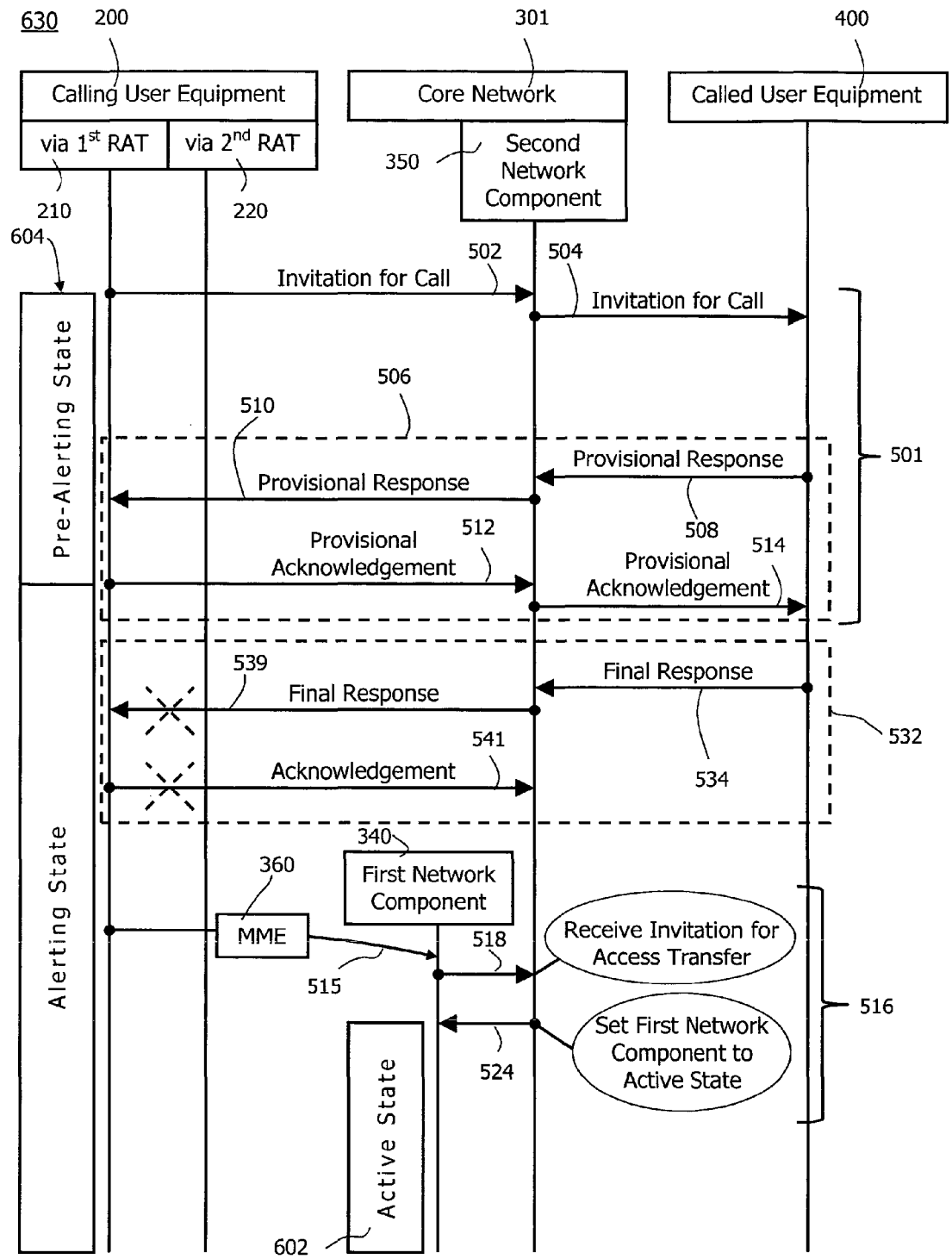
FIG. 5 shows a signaling diagram schematically illustrating a third case of a signal loss leading to inconsistent session states.

FIG. 5 shows a signaling diagram 630 schematically illustrating a third case of losing a response relevant for the call state in the context of a transfer. The third case is similar to the second case described with reference to the signaling diagram 620 in that the final response 539 is lost. The third case differs from the second case in that a successful signal communication 506 has changed the call state 604 of the mobile device 200 from the initial Pre-Alerting Call State to the Alerting Call State. The third case thus also applies to a mobile device 200 according to Release 11 of specification 3GPP TS 24.237.

During the transfer, the remote communication device 400 answers the call, which is indicated to the second network component 350 receiving the final response 534. The final response 534 is forwarded as the final response 539 towards the mobile device 200, which does not receive the final response 539 due to the radio connection break when the mobile device 200 executes the handover from the first RAT 310 to the second RAT 320.

Upon receiving the invitation 518 for the transfer, the second network component 350 directly replies with the final response 524, so that the component call state 602 of the first network component 340 is also set to the Active Call State. The conventional technique for transfer according to the signal communication 516 thus leads to the call state 604 being in the Alerting Call State, which is inconsistent with the correct component call state 602 being in the Active Call State.

As pointed out above, Clause 12.6.3 of specification 3GPP TS 24.237 requires the MSC 340 to verify the call state 604 using the Status Enquiry message and to release the session for the call upon receiving the Status response indicating that the call state 604 of the mobile device 200 is in the incompatible Alerting Call State (also referred to as "call delivered state").

The conventional technique thus leads to an unexpected termination of the ringing tone output by the mobile device 200 during the Alerting Call State.

The occurrence of inconsistent call states 602 and 604 due to the loss of messages in the context of a transfer thus leads to a service termination in at least some situations according to both Release 11 and expected Release 12 of standard specification 3GPP TS 24.237.

Figure 6:
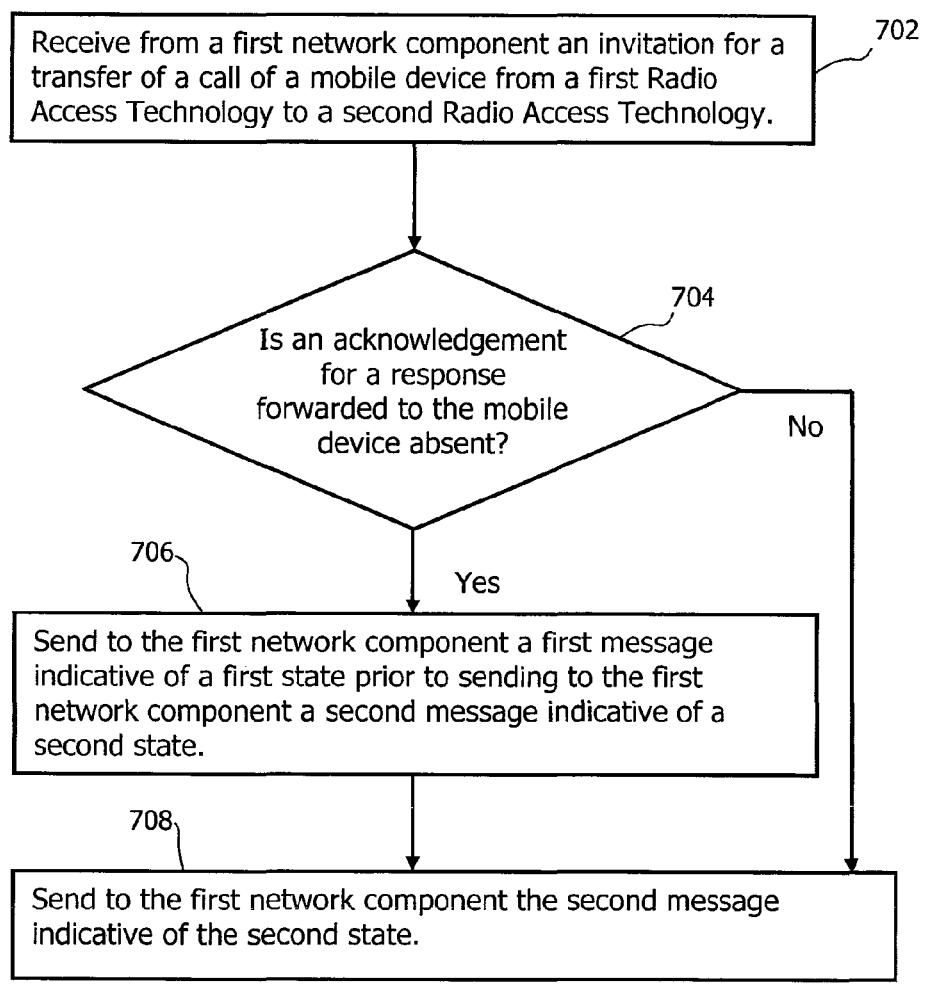
FIG. 6 shows a flowchart of a method embodiment that can be performed by the apparatus in the telecommunications network shown in FIG. 1.

FIG. 6 shows a flowchart of an embodiment of a method 700 of changing a call state of a mobile device connectable to a telecommunications network via a first RAT and a second RAT. The telecommunications network is configured to forward towards a callee an invitation for a call originating via the first RAT from the mobile device and to forward a response relevant for the call state via the first RAT towards the mobile device. The response is relevant for the call state in that the response indicates a change of the call state from a first state to a second state. A first network component of the telecommunications network is configured to change via the second RAT the call state of the mobile device when receiving a first message indicative of the first state followed by receiving a second message indicative of the second state.

The method 700 includes a step 702 of receiving from the first network component an invitation for a transfer of a mobile device from the first RAT to the second RAT. In a decision step 704, the presence or absence of an acknowledgment for the response forwarded to the mobile device is assessed. In case the acknowledgement is absent, the first message indicative of the first state is sent to the first network component in a step 706 of the method 700. Otherwise, the second message indicative of the second state is directly sent to the first network component in a step 708 without the prior step 706.

Consequently, the first network component causes via the second RAT that the call state of the mobile device is changed from the first state to the second state, if the acknowledgment for the forwarded response is absent. In case the mobile device has acknowledged the forwarded response, there is no need for changing the call state of the mobile device after completion of the transfer. In both the case of absence and the case of presence of the acknowledgement, the step 708 sets up the first network component in accordance with the current second state of the call.

The method 700 can be implemented entirely by the second network component 350. FIG. 1 schematically illustrates an embodiment of a device 350 for changing a call state of a mobile device. The device 350 includes a receiving unit 356 and a sending unit 358. The receiving unit 356 is adapted to perform the step 702. The sending unit 358 is adapted to perform the steps 704, 706 and 708. For example, each of the steps 702 to 708 can be performed by the SCC-AS 354, and other units in the second network component 350 or other components in the communication network 300 essentially forward messages sent or received by the SCC-AS 354.

Figure 7:
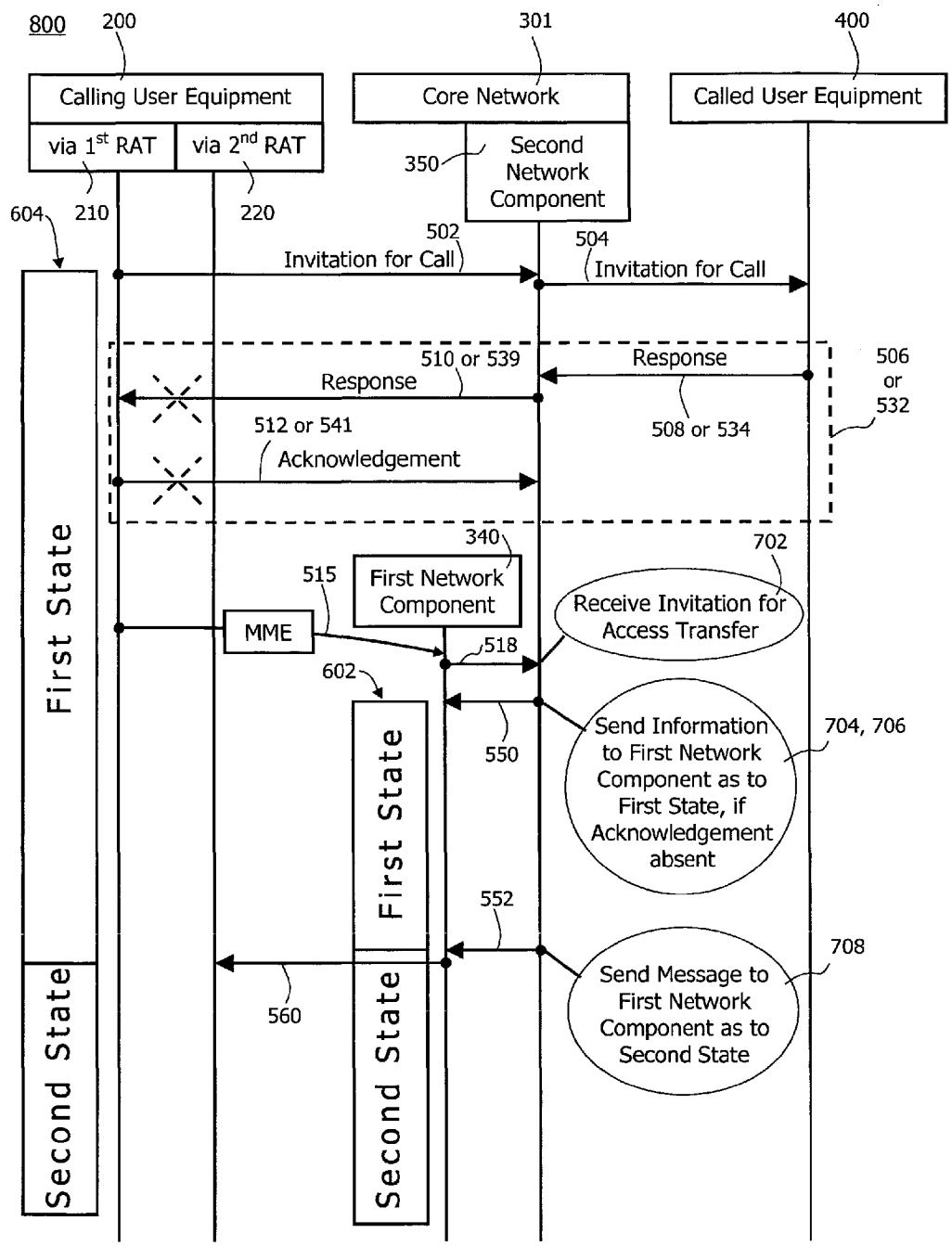
FIG. 7 shows a signaling diagram schematically illustrating signals exchanged as a result of an exemplary implementation of the apparatus of FIG. 1 and the method of FIG. 7.

FIG. 7 shows a signaling diagram 800 schematically illustrating signals exchanged when operating the second network component 350 according to the method 700. Intermediate components, e.g. those that at least essentially forward messages indicated in the signaling diagram 800, have been omitted for clarity.

The second network component 350 receives the invitation 502 for the call originating from the mobile device 200. The second network component 350 forwards the invitation 504 towards the remote communication device 400. The telecommunications network 300 and the mobile device 200 are in a first state, which can be the initial state after exchanging the invitation 502-504, or which can be the result of one or more optional signal communications, e.g., the signal communication 506.

A response, e.g., the provisional response 508, the final response 534 or any other response relevant for the call state 604, is received at the second network component 350. The response indicates the second state. The response is configured to induce the change of the call state 604, if received by the mobile device 200. The second network component 350 forwards the response via the first RAT 310 towards the mobile device 200. Due to a necessary or ongoing transfer from the first RAT 310 to the second RAT 320, the forwarded response or an expected acknowledgement to the forwarded response is lost when exchanged via the first RAT 310. Both the loss of the forwarded response and the loss of the expected acknowledgment result in the absence of the expected acknowledgment at the second network component 350.

When the second network component 350 receives the invitation 518 for the transfer from the first network component 340 according to the step 702 of the method 700, the second network component 350 does not send a message for setting the component call state 602 of the first network component 340 in accordance with the current second state of the call. Rather, the second network component 350 sends a first message 550 to the first network component 340 as to the first state, if the acknowledgment to the forwarded response is absent according to the steps 704 and 706. The second network component 350 then readily sends a second message 552 to the first network component 340 as to the second state according to the step 708. Sending firstly information as to the first state and sending secondly the message as to the second state induces a change of the component call state 602 of the first network component 340 from first to second state, which in turn causes the first network component 340 to send a message 560 via the second RAT 320 towards the mobile device 200 inducing a change of the call state 604 of the mobile device 200 from the first state to the second state. As a result, the call state 604 of the mobile device 200 is consistent with the component call state 602 at the side of the telecommunications network 300.

Figure 8:
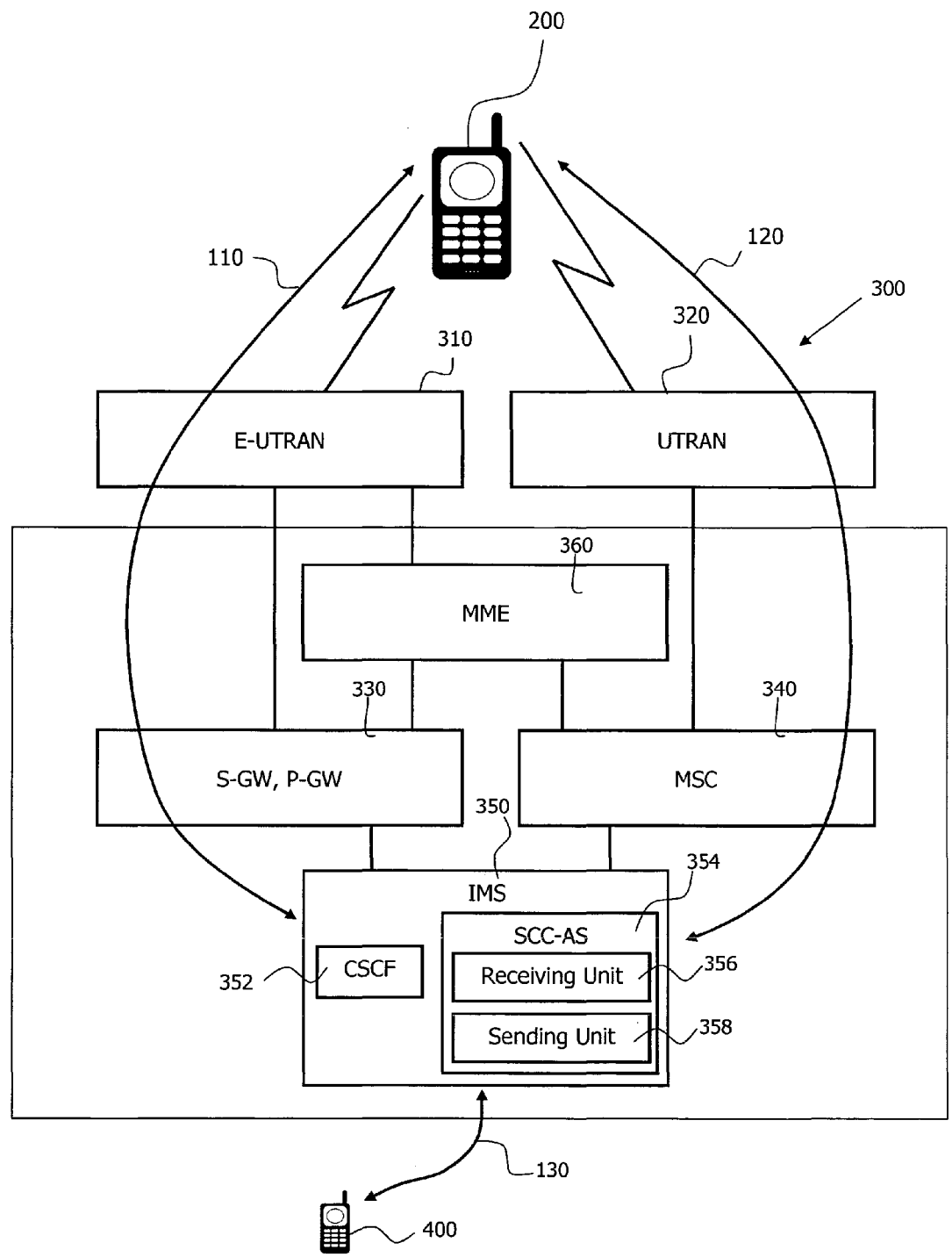
FIG. 8 schematically illustrates an exemplary implementation of the apparatus and the telecommunications network shown in FIG. 1.

FIG. 8 schematically illustrates a more detailed implementation of the communication system 100. The first RAT 310 is implemented in accordance with an Evolved UMTS Terrestrial Radio Access (E-UTRA). The E-UTRAN 310 is coupled to the gateway component 330. The gateway component 330 includes a Serving Gateway (S-GW) and a Packet Data Network Gateway (P-GW). The S-GW is responsible for handovers with neighboring base stations (eNodeB) and for data transfer across a user plane. The P-GW provides a link between the E-UTRAN 310 and services that reside in an external packet network, such as the second network component 350 implemented by an IP Multimedia Subsystem (IMS). The P-GW allocates a dynamic IP address for the mobile device 200 and routes the user plane packets. The first access leg 110 is thus fully implemented in the packet-switched domain.

Messages exchanged via the first access leg 110 for establishing the call apply the Session Initiation Protocol (SIP). The SIP is a signaling protocol defined by the Internet Engineering Task Force (IETF).

The second access leg 120 includes the UMTS Terrestrial Radio Access Network (UTRAN) providing the second RAT 320 and a Mobile-services Switching Center (MSC) as the first network component 340. The MSC 340 routes voice calls and Short Message Services (SMS) as well as other services such as conference calls, facsimile and circuit-switched data. The MSC 340 thus provides the circuit-switched bearer 606 via the second access leg 120.

The IMS 350 includes Call Session Control Functions (CSCF) 352 and the Service Centralization and Continuity (SCC) Application Server (AS) 354. The IMS 350 has no direct connection to either of the two Radio Access Networks. The indirect connection towards the mobile device 200 using LTE as the first RAT 310 is via the Evolved Packet Core (EPC) network. The indirect connection towards the mobile device 200 using GERAN or UTRAN is via the Circuit Switched (CS) network. The MSC 340 is part of the Circuit Switched (CS) network. The term Core Network 301, as used herein, includes both the EPC network and the CS network.

In the exemplary embodiment of the second network component 350 shown in FIG. 8, the SCC-AS 354 includes the receiving unit 356 and the sending unit 358 for performing the technique disclosed herein. In another embodiment of the second network component 350, the CSCF 352 includes one or both of the receiving units 356 and the sending unit 358. In a still further embodiment of the second network component 350, the receiving unit 356 and/or the sending unit 358 are not collocated with the CSCF 352 and the SCC-AS 354.

Figure 9:
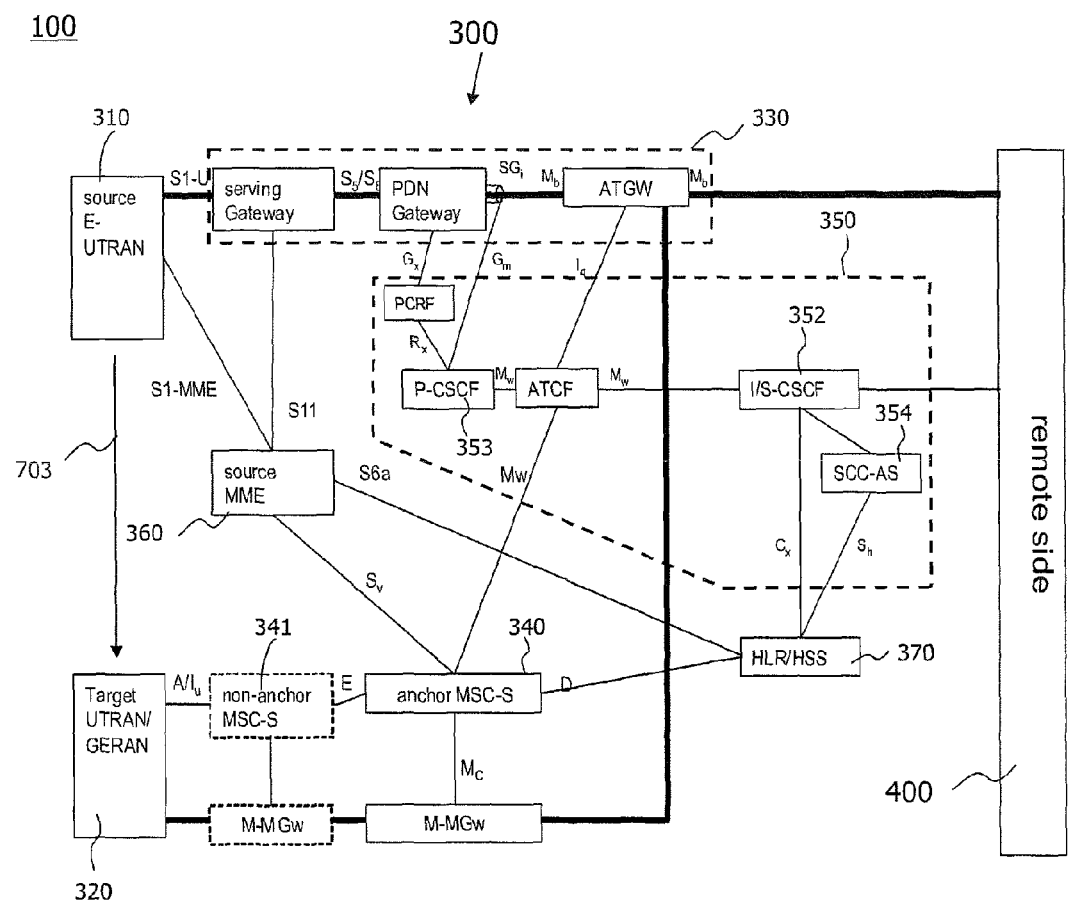
FIG. 9 shows a block diagram of a more detailed implementation of the telecommunications network shown in FIGS. 1 and 8.

FIG. 9 schematically illustrates further details of the communication system 100. An arrow indicates the transfer 703 from the first RAT 310 to the second RAT 320. For the clarity of the illustration, nodes that are not necessarily involved in media streaming management and interworking with other networks are not shown in the block diagram of FIG. 9. Bold lines represent the media stream connections. Thin lines represent signaling interfaces.

The MSC 340 is a switching node for circuit-switched data in the GSM and UMTS domain. Different MSCs 340, 341 are responsible for different geographic areas. Since Release 4, the MSC is split in the subcomponents MSC server and media gateway (M-M Gw). The term MSC as used herein also encompasses the MSC server. Nodes indicated by dashed lines are only involved in the SRVCC procedure in case an inter-MSC handover occurs at the same time.

At least in some implementations of the telecommunications network 300, the technique can be implemented exclusively in the IMS 350 or using both the IMS 350 and the anchoring MSC 340.

In addition to the S-GW and the P-GW shown in FIG. 8, in the embodiment of the telecommunications network 300 shown in FIG. 9, the gateway component 330 further includes an Access Transfer Gateway (ATGW). The IMS 350 further includes an Access Transfer Control Function (ATCF).

The Call Session Control Functions (CSCF) include a proxy functionality (P-CSCF) 353. The ATCF is co-located with the P-CSCF 353 and coupled to the ATCF via an interface Mw. The interface between the ATCF and the ATGW is Iq according to standard specification 3GPP TS 23.334 (e.g., Version 11.2.0). The telecommunications network 300 further includes a Home Subscriber Server (HSS) 370. The subscription information STN-SR included in the invitation message 518 for the transfer 703 is provided to the HSS 370. The SCC-AS 354 correlates the transfer request with the anchored session using information provided in the incoming invitation message 518 and correlates the second access leg 120, which is created responsive to the transfer update message in the signal communication 520 from the ATCF, with the remote leg 130. The SCC-AS 354 uses an interface ISC towards the S-CSCF 352 for execution of the transfer 703. Each of the interfaces Mw and ISC applies the SIP as the communication protocol.

The technique is described in more detail for an implementation in accordance with the communication system 100 shown in FIG. 8 or the communication system 100 shown in FIG. 9 for the three cases of signal loss described with reference to the signaling diagrams 610, 620 and 630. On the first communication leg 110 including the first RAT 310 and the IP bearer 608, SIP is applied for the communication.

Figure 10:
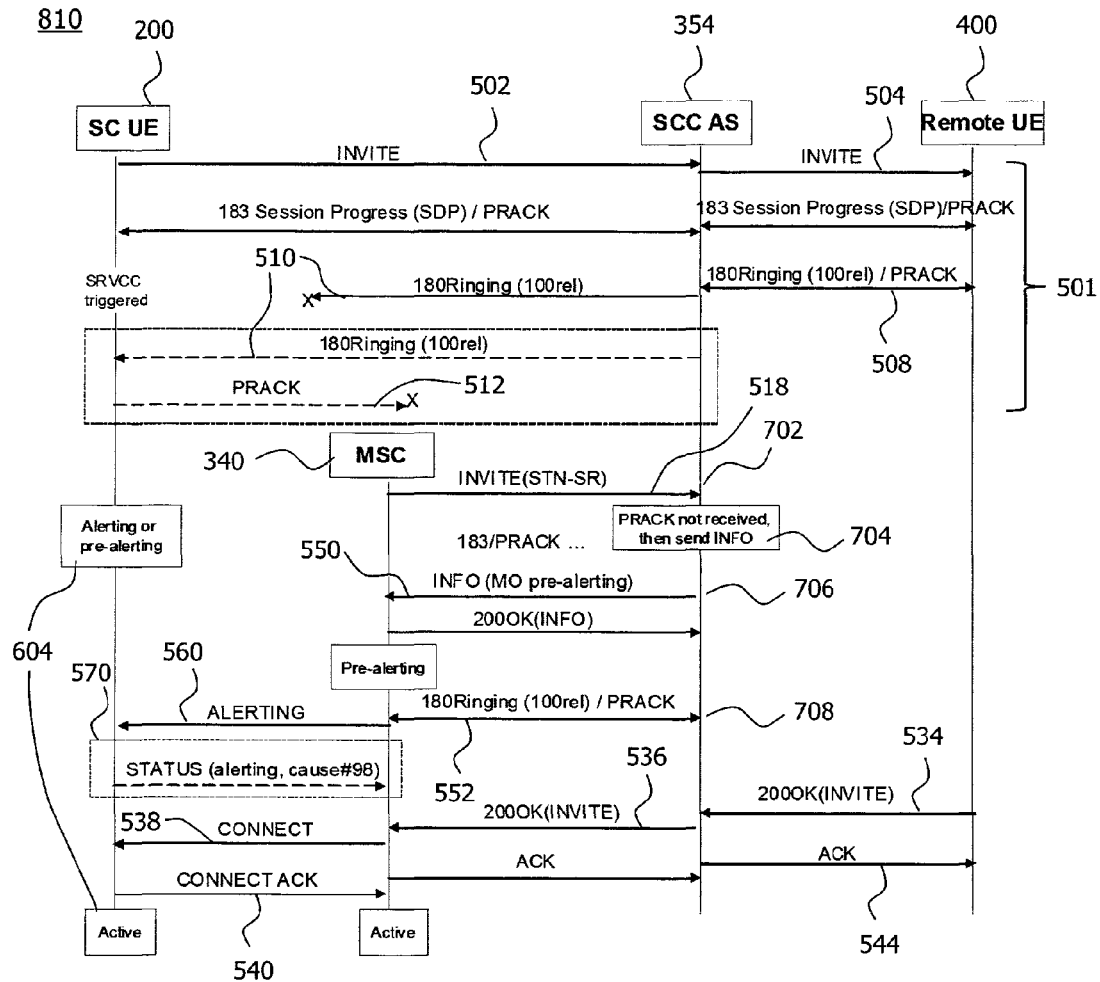
FIG. 10 shows a signaling diagram resulting from a first implementation of the apparatus of FIG. 1 and the method of FIG. 6.

FIG. 10 shows a signaling diagram 810 for the first case of losing the SIP 180 Ringing provisional response 510 forwarded towards the mobile device 200 in the signal communication 501, or the provisional acknowledgment thereto (shown in dashed lines), in the context of the SRVCC transfer in the mobile originating Pre-Alerting Call State. The signal communication 501 includes receiving the invitation 502 for a speech session from the mobile device 200. The speech session has been anchored at the SCC-AS 354. An early dialog has been established by forwarding the invitation 504 towards the remote communication device 400. Both communication ends 200 and 400 have reserved resources due to early media generation. The SRVCC handover is triggered towards the mobile device 200 according to a decision of the first RAT 310 as the source RAT before receiving the SIP 180 Ringing provisional response 508.

When the SCC-AS 354 receives the invitation 518 due to the STN-SR for session transfer from the MSC 340 according to the step 702, the SCC-AS 354 has received the SIP 180 Ringing provisional response 508 from the remote communication device 400. The provisional acknowledgment 512 for the provisional response 510 has not been received from the mobile device 200 at the SCC-AS 354, which is determined in the step 704. An optional SIP 183 Session Progress message, which is included in the signal communication 501, is reproduced by the SCC-AS 354 for setting up the MSC 340.

The SCC-AS 354 sends the information message 550 indicative of the mobile originating Pre-Alerting Call State to the MSC 340 in the step 706. At this point in time, the SIP 200 OK final response 534 has not yet been received at the SCC-AS 354 from the remote communication device 400. The MSC 340 acknowledges the information request 550 by sending an SIP 200 OK response to the SCC-AS 354. As a result, the MSC 340 is in the Pre-Alerting Call State and the SCC-AS 354 is aware that the call is already in the Alerting Call State.

In case the IMS 350 does not generate an in-band ringing tone as early media, the SCC-AS 354 sends SIP 180 Ringing message 552 indicative of the Alerting Call State towards the MSC 340 according to the step 708.

Upon receiving the SIP 180 Ringing message 552 from the SCC-AS 354 after having received the information request 550 indicative of the Pre-Alerting Call State, the MSC 340 sends in the circuit-switched domain via the second RAT 320 a "CC ALERTING" message 560 to the mobile device 200. If the provisional response 510 was lost in the packet-switched first RAT 310 and the mobile device 200 has not yet received a network-generated ringing tone as early media, the mobile device 200 generates a local ringing tone in response to the alerting message 560. The call state 604 of the mobile device 200 is thus changed from the Pre-Alerting Call State to the Alerting Call State.

If the mobile device 200 has received the provisional response 510 indicative of the Alerting Call State via the first RAT 310, i.e., the provisional acknowledgement 512 was lost at the radio interface, the mobile device 200 ignores the alerting message 560.

Optionally, the mobile device 200 sends a Status message 570 to the MSC 340, if the provisional response 510 has been received and the provisional acknowledgment 512 was lost. The Status message 570 indicates that the call state 604 of the mobile device 200 has been in the Alerting Call State upon receiving the message 560. The Status message 570 further indicates the cause (identified by the cause number #98) for sending the Status message 570. Cause numbers are defined for the second RAT 320 implemented according to GSM in the document GSM 04.63, Version 5.0.0, Clause 8.4 (May 1996). Cause numbers are also defined for the second RAT 320 implemented according to UMTS in document 3GPP TS 24.008, Version 12.0.0, Clause 5.5.3.2.2. The cause #98 indicates that the "message type is not compatible with protocol state".

As a result, in both the case of losing the provisional response 510 and the case of losing the provisional acknowledgment 512, the call state 604 of the mobile device 200 is in the Alerting Call State, which is consistent with the component call state 602 of the MSC 340 and corresponds to the current state of the call.

As the remote communication 400 answers the call, the SIP 200 OK final response 534 to the invitation 502-504 is received by the SCC-AS 354 and forwarded as the final response 536 towards the MSC 340. The MSC 340 updates its component call state 602 to the Active Call State and sends the Connect message 538 via the second RAT 320 to the mobile device 200 to activate the call. The call state 604 of the mobile device 200 enters the Active Call State and the mobile device 200 sends the Connect Acknowledgment message 540 to the MSC 340.

Figure 11:
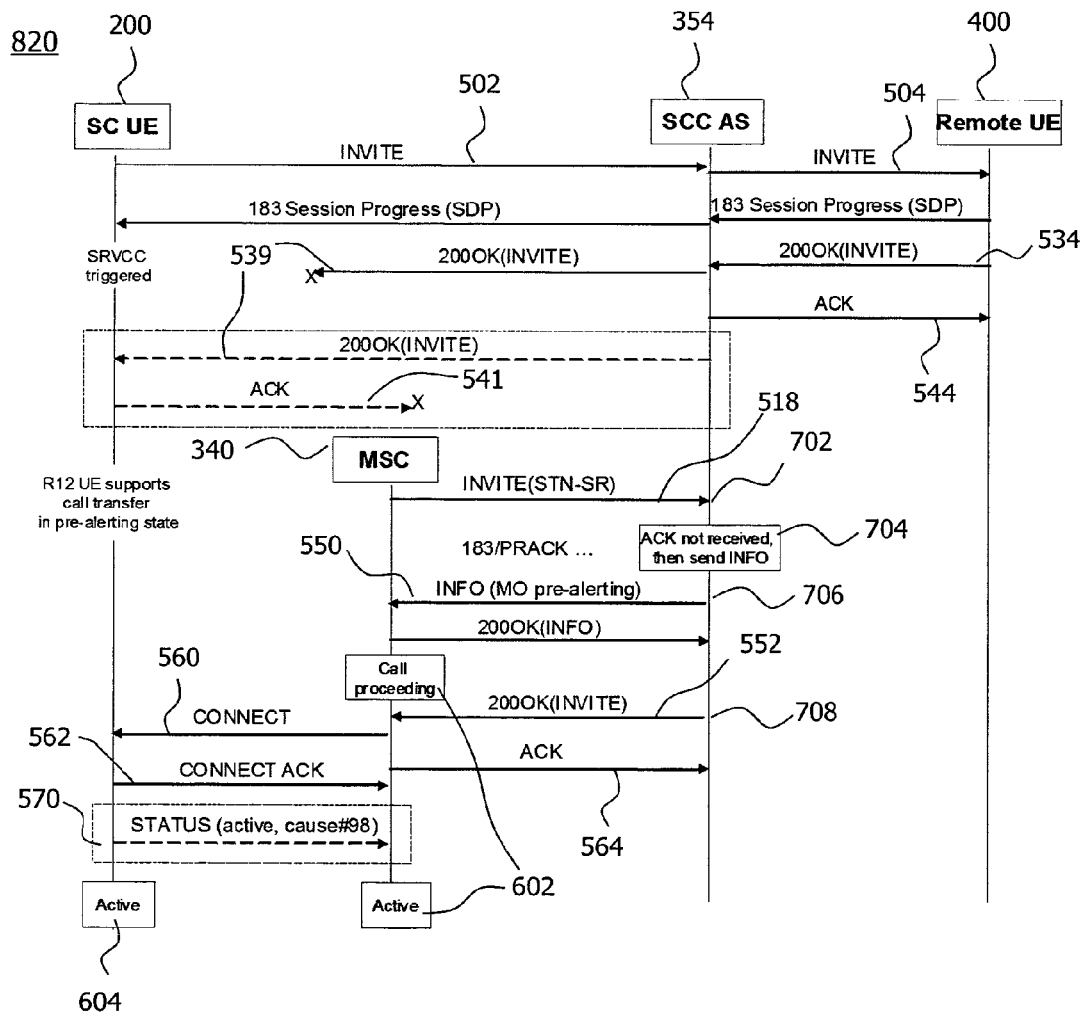
FIG. 11 shows a signaling diagram resulting from a second implementation of apparatus of FIG. 1 and the method of FIG. 6.

FIG. 11 shows a signaling diagram 820 schematically illustrating signals exchanged in the communication system 100, when the method 700 is performed or the second network component 350 is operated in the second case of losing the final response 539, or the final acknowledgement 541 thereto (shown in dashed lines), in the Pre-Alerting Call State. The SIP 180 Ringing provisional response is not used during call setup.

When the SCC-AS 354 receives the invitation 518 due to the STN-SR for session transfer from the MSC 340 according to the step 702, it is determined whether or not the acknowledgment 541 for the forwarded final response 539 has been received according to the step 704. If the SCC-AS 354 has not received the final acknowledgment 541 for the final response 539, the SCC-AS 354 sends an information request 550 indicative of the mobile originating Pre-Alerting Call State to the MSC 340 according to the step 706. The absence of the acknowledgment 541 can be due to the loss of the forwarded response 539 or the acknowledgment 541.

After receiving the SIP 200 OK final response to the information request 550, the SCC-AS 354 immediately sends the SIP 200 OK final response message 552 for the invitation 518 to the MSC 340 according to the step 708.

The step 708 thus causes the component call state 602 of the MSC 340 to change from the Pre-Alerting Call State (also referred to as Call Proceeding State) to the Active Call State. Triggered by the change of the component call state 602, the MSC 340 sends the Connect message 560 to the mobile device 200 as a normal transfer for SRVCC mobile originating alerting calls, because the MSC 340 has received the information request 550 indicative of the mobile originating Pre-Alerting Call State before receiving the final response message 552 indicative of the Active Call State.

When the mobile device 200 receives the Connect message 560 inside the signaling transaction associated with the transferred call from the MSC 340, the mobile device 200 handles the Connect message 560 as a normal transfer indication for the SRVCC mobile originating alerting call. Consequently, the mobile device 200 sends a connect acknowledgment message 562 and the call state 604 of the mobile device 200 enters the Active Call State, if the final response 539 forwarded to the mobile device 200 was lost.

If the mobile device 200 has received the final response 539 for the initial invitation 502 in the packet-switched domain and entered the Active Call State (which is expected to be supported in Release 12 of 3GPP TS 24.237 also in the Pre-Alerting Call State), the acknowledgment message 541 was lost. The provided Connect message 560 requires a change of the call state 604 to the Active Call State. Since the call state 604 of the mobile device 200 when receiving the Connect message 560 is already in the Active Call State, the mobile device 200 sends a Status message 570 according to Clause 8.4 of document 3GPP TS 24.008. The Status message 570 indicates that the call state 604 is the Active Call State and includes the cause #98 indicating that the "message type is not compatible with protocol state".

Upon receiving the Connect Acknowledgment message 562 or the Status message 570 (e.g., in response to the Connect message 560), the MSC 340 is informed that the mobile device 200 has entered the Active Call State. The component call state 602 of the MSC 340 thus also enters the Active Call State. The telecommunications network 300, e.g., the MSC 340, thus considers the transfer as successfully completed.

Figure 12:
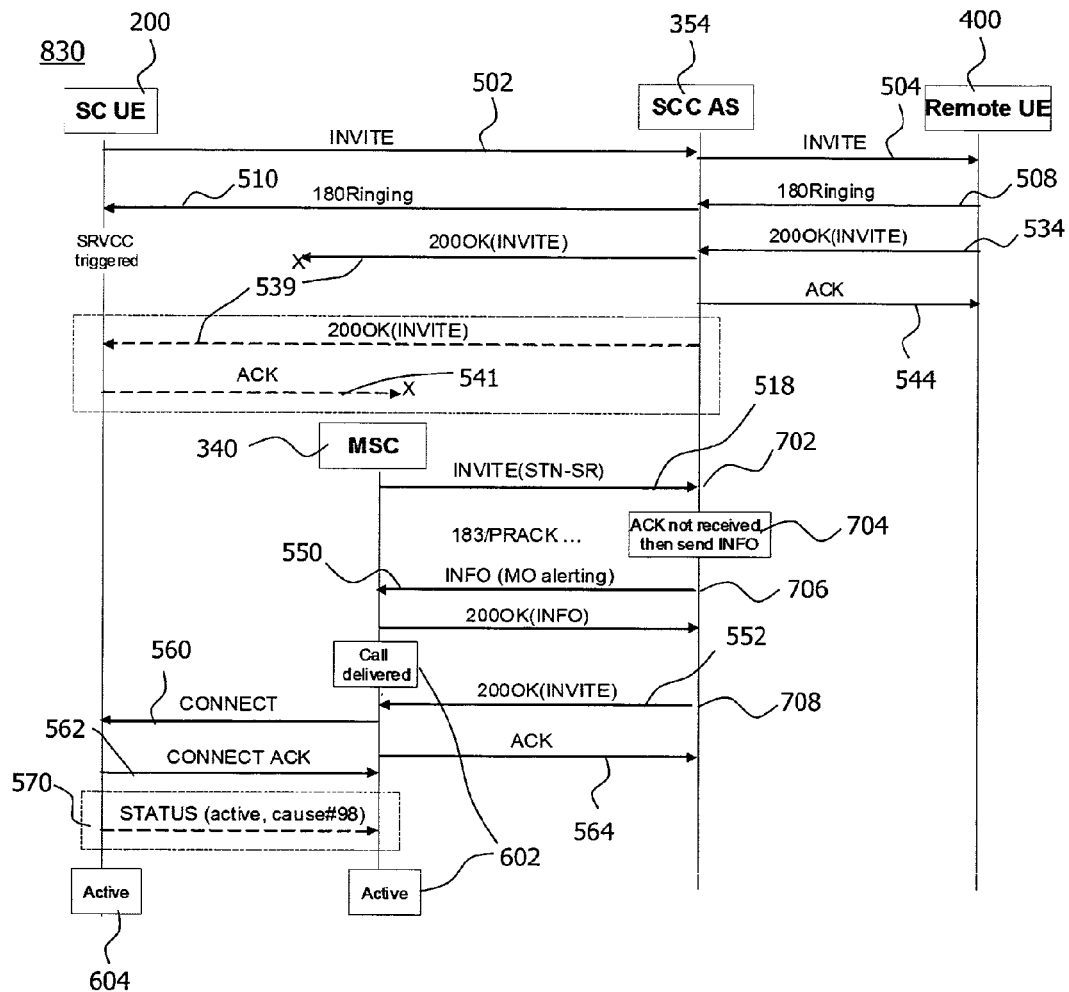
FIG. 12 shows a signaling diagram resulting from a third implementation of apparatus of FIG. 1 and the method of FIG. 6.

FIG. 12 shows a signaling diagram 830 schematically illustrating signals exchanged in the communication system 100 when performing the method 700 or operating the second network component 350 in the third case of losing the final response, or the acknowledgment thereto (shown in dashed lines), in the Alerting Call State.

The signaling diagram 830 is similar to the signaling diagram 820 described for the second case. The signaling diagram 830 differs in that the SIP 180 Ringing provisional response 508 is received by the SCC-AS 354 and forwarded as the provisional response 510 to the mobile device 200. The mobile device 200 successfully receives the provisional response 510 and changes its call state 604 to the Alerting Call State.

The further signal communication corresponds to the signaling diagram 820 for the second case except that the information request 550 is indicative of the mobile originating Alerting Call State in the third case schematically illustrated in the signaling diagram 830.

In the exemplary signal communication described for the signaling diagrams 810, 820 and 830, the call state 604 of the mobile device 200 coincides with the first state indicated to the first network component 340 by means of the information 550. This coincidence is not required in all implementations of the technique. The first state indicated by the information 550 sent to the first network component 340 in the step 706 can be any state that is assumable by the first network component 340 prior to switching to the second state so that the switching of the component call state 602 triggers the sending of the message 560 updating the call state 604 of the mobile device 200 to the second state.

Optionally, as exemplified in each of the signaling diagrams 820 and 830, the final acknowledgment message 544 is immediately sent towards the remote communication device 400 by the second network component 350 after receiving the final response 534, so that the remote communication device 400 is left unaware of the delay caused by the transfer 703.

As has to become apparent from above description of exemplary embodiments, by sending information as to a first state, although this first state is not the current state of the session, prior to sending a message as to a second state to a first network component, a second network component can trigger, at least in some situations, the first network component to change the call state of the mobile device so that the call state of the mobile device is consistent with at least one of a component call state at the side of the telecommunications network and the call state assumed by the remote communication device as the callee. The technique is not limited to voice calls and can readily be applied to video calls, and other media sessions that need to be transferred while a state of the session is changing.

At least some of the embodiments improve the success rate for SRVCC transfer of calls in Pre-Alerting or Alerting Call State. Same or some other embodiments improve the overall success rate for SRVCC transfers. Some embodiments improve a user experience when Voice over LTE is deployed in hotspot areas.

It is believed that many advantages of the technique are fully understood from the foregoing description, and it will be apparent that various changes can be made in the type of sessions, the choice of first and/or second states as well as in the form, construction and arrangement of the exemplary aspects thereof without departing from the scope of the invention or without sacrificing all of its advantages, because the invention can be varied in many ways, it will be recognized that the invention should be limited only by the scope of the following claims.

The invention claimed is:

1. A method of triggering a change of a call state of a mobile device connectable to a telecommunications network by a first Radio Access Technology and a second Radio Access Technology, wherein the telecommunications network is configured to forward towards a callee an invitation for a call originating by the first Radio Access Technology from the mobile device and to forward a response of the callee by the first Radio Access Technology towards the mobile device, the response indicating a change of the call state from a first state to a second state, and wherein a first network component of the telecommunications network is configured to change by providing a message to the mobile device by the second Radio Access Technology the call state of the mobile device to the second state when receiving a second message indicative of the second state preceded by receiving a first message indicative of the first state, the method comprising the steps performed by a second network component of the telecommunications network:

receiving from the first network component an invitation for a transfer of the call from the first Radio Access Technology to the second Radio Access Technology; and responsive to an acknowledgement for the response forwarded to the mobile device being absent, sending to the first network component the second message indicative of the second state preceded by sending to the first network component the first message indicative of the first state.

2. The method of claim 1, wherein the second message indicative of the second state is sent responsive to an acknowledgment received from the first network component for the first message indicative of the first state.

3. The method of claim 1, wherein sending the first message indicative of the first state includes sending an information request to the first network component.

4. The method of claim 1, further comprising updating a communication leg to the callee as to the transfer, wherein the absence of the acknowledgment is determined upon or after the updating of the communication leg to the callee.

5. The method of claim 1, wherein the first state represents an alerting call and the second state represents an active call.

6. The method of claim 5, wherein the response of the callee includes a final response to the invitation for the call.

7. The method of claim 5, wherein the acknowledgement that is absent is a final response acknowledgment.

8. The method of claim 1, wherein the first state represents a pre-alerting call and the second state represents an alerting call.

9. The method of claim 8, wherein the response of the callee includes a provisional response to the invitation for the call.

10. The method of claim 8, wherein the acknowledgement that is absent is a provisional response acknowledgment.

11. The method of claim 1, wherein the invitation for the transfer is received in art early dialog initiated by the invitation for the call.

12. The method of claim 1, wherein the response is forwarded prior to or during performing the transfer.

13. The method of claim 12, wherein the transfer is performed in an alerting state or a pre-alerting state of the call.

14. The method of claim 1, wherein the transfer includes a transfer from a packet-switched domain using the first Radio Access Technology to a circuit-switched domain using the second Radio Access Technology.

15. The method of claim 1, wherein at least one of the invitation for the call, the response from the callee and the invitation for the transfer are exchanged according to a Session Initiation Protocol, or SIP.

16. The method of claim 1, wherein the first network component includes a Mobile-services Switching Center (MSC) communicating towards the mobile device by the second Radio Access Technology.

17. The method of claim 1, wherein the second network component includes an Internet Protocol Multimedia Subsystem (IMS) selectively communicating towards the mobile device by the first Radio Access Technology and the second Radio Access Technology, and wherein the call is anchored at the IMS.

18. The method of claim 1, wherein call states assumable by the mobile device and/or indicatable by the response include a Call Proceeding State, a Call Delivered State and an Active Call State.

19. A computer program product comprising a non-transitory computer readable storage medium storing program code for performing the steps of claim 1 when the program code is executed on one or more computing devices.

20. An apparatus for triggering a change of a call state of a mobile device connectable to a telecommunications network by a first Radio Access Technology and a second Radio Access Technology, wherein the telecommunications network is configured to forward towards a callee an invitation for a call originating by the first Radio Access Technology from the mobile device and to forward a response of the callee by the first Radio Access Technology towards the mobile device, the response indicating a change of the call state from a first state to a second state, and wherein a first network component of the telecommunications network is configured to change by providing a message to the mobile device by the second Radio Access Technology the call state of the mobile device to the second state when receiving a second message indicative of the second state preceded by receiving a first message indicative of the first state, the apparatus comprising:
 a receiving unit adapted to receive from the first network component an invitation for a transfer of the call from the first Radio Access Technology to the second Radio Access Technology; and
 a sending unit adapted to send to the first network component the second message indicative of the second state preceded by sending to the first network component the first message indicative of the first state, responsive to an acknowledgement for the response forwarded to the mobile device being absent.

21. The apparatus of claim 20, wherein the functionality of the apparatus is located in a second network component of the telecommunications network.

22. A telecommunications network for triggering a change of a call state of a mobile device connectable to a telecommunications network by a first Radio Access Technology and a second Radio Access Technology, wherein the telecommunications network is configured to forward towards a callee an invitation for a call originating by the first Radio Access Technology from the mobile device and to forward a response of the callee by the first Radio Access Technology towards the mobile device, the response indicating a change of the call state from a first state to a second state, the telecommunications network, comprising:
 a first network component configured to change by providing a message to the mobile device by the second Radio Access Technology the call state of the mobile device to the second state when receiving a second message indicative of the second state preceded by receiving a first message indicative of the first state; and
 a second network component including a receiving unit adapted to receive from the first network component an invitation for a transfer of the call from the first Radio Access Technology to the second Radio Access Technology, and a sending unit adapted to send to the first network component the second message indicative of the second state preceded by sending to the first network component the first message indicative of the first state, responsive to an acknowledgement for the response forwarded to the mobile device being absent.

23. The telecommunications network of claim 22, wherein the first network component is further configured to provide by the second Radio Access Technology to the mobile device the message changing the call state due to the second message indicative of the second state.

24. The telecommunications network of claim 23, wherein the first network component is further configured to receive from the mobile device a status message indicating at least one of that the mobile device is already in the second state and a protocol type incompatibility between the call state of the mobile device and the provided message for the change of the call state.

25. The telecommunications network of claim 24, wherein the first network component is adapted to switch to the second state in response to receiving the status message from the mobile device indicating the second state.

* * * * *